(12) United States Patent
Murata

(10) Patent No.: US 8,509,083 B2
(45) Date of Patent: Aug. 13, 2013

(54) BAND MANAGEMENT APPARATUS AND BAND MANAGEMENT METHOD

(75) Inventor: Masao Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 12/003,285

(22) Filed: Dec. 21, 2007

(65) Prior Publication Data

US 2008/0159147 A1 Jul. 3, 2008

(30) Foreign Application Priority Data

Dec. 27, 2006 (JP) ................................. 2006-353265

(51) Int. Cl.
*G01R 31/08* (2006.01)

(52) U.S. Cl.
USPC ........................................................ 370/236

(58) Field of Classification Search
USPC ............ 370/258, 203, 229–236, 392, 395.21, 370/395.41, 395.61, 468, 469, 477
See application file for complete search history.

(56) References Cited

U.S. PATENT DOCUMENTS

| | | | | |
|---|---|---|---|---|
| 5,978,378 A * | 11/1999 | Van Seters et al. | ........... | 370/401 |
| 7,062,559 B2 * | 6/2006 | Yoshimura et al. | ........... | 709/226 |
| 7,088,714 B2 * | 8/2006 | Athreya et al. | ............... | 370/389 |
| 7,345,991 B1 * | 3/2008 | Shabtay et al. | ............... | 370/221 |
| 7,355,965 B2 * | 4/2008 | Griswold et al. | ............. | 370/216 |
| 7,436,784 B2 * | 10/2008 | Hashimoto | .................... | 370/258 |
| 7,453,877 B2 * | 11/2008 | Kong et al. | ................... | 370/392 |
| 7,483,399 B2 * | 1/2009 | Zelig et al. | .................... | 370/258 |
| 7,492,763 B1 * | 2/2009 | Alexander, Jr. | ............... | 370/389 |
| 7,532,588 B2 * | 5/2009 | Enomoto et al. | .............. | 370/256 |
| 7,532,634 B2 * | 5/2009 | Higashitaniguchi et al. | . | 370/404 |
| 7,545,735 B1 * | 6/2009 | Shabtay et al. | ............... | 370/217 |
| 2005/0141416 A1 * | 6/2005 | Kobayashi et al. | ........... | 370/229 |
| 2006/0209726 A1 * | 9/2006 | Kawasumi | .................... | 370/258 |
| 2006/0222007 A1 | 10/2006 | Karakawa et al. | | |
| 2007/0076755 A1 * | 4/2007 | Sato et al. | ..................... | 370/468 |
| 2008/0008180 A1 * | 1/2008 | Sawada | ......................... | 370/392 |

FOREIGN PATENT DOCUMENTS

JP 2006-261825 9/2006
JP 2006287425 A 10/2006

* cited by examiner

*Primary Examiner* — Kwang B Yao
*Assistant Examiner* — Jung-Jen Liu
(74) *Attorney, Agent, or Firm* — Smith, Gambrell & Russell, LLP

(57) ABSTRACT

According to an aspect of an embodiment, a band management apparatus that manages a communication band of a transmission path between data relay devices in a ring network comprises a hypothetical network management information storage unit that stores information on the communication band set for the transmission path for each hypothetical network set in such a way as to include the data relay devices, a communication band calculator that calculates the communication band for each transmission path between neighboring data relay devices contiguously connected without sandwiching another data relay device, based on the information stored by the hypothetical network management information storage unit and a communication band setting unit that individually sets each communication band calculated by the communication band calculator as the communication band of the transmission path between the neighboring data relay devices.

14 Claims, 31 Drawing Sheets

FIG. 3

| VLAN ID | Transmission RPR node number | Transmission band (Mbps) | RPR band (guaranteed/ best effort) | Reception RPR node number |
|---|---|---|---|---|
| 1 | S1 | 400 | Guaranteed | S2 |
| ... | ... | ... | ... | ... |
| 3 | S2 | 100 | Guaranteed | S4,S5 |
| ... | ... | ... | ... | ... |

FIG. 6

| RPR node number | RPR packet transmission direction (Ringlet 0/Ringlet 1) | | | | | | Protection (switching) information |
|---|---|---|---|---|---|---|---|
| | Destination node 1 | Destination node 2 | Destination node 3 | Destination node 4 | Destination node 5 | Destination node 6 | |
| S1 | – | Ringlet0 | Ringlet0 | Ringlet0 | Ringlet1 | Ringlet1 | Yes |
| S2 | Ringlet1 | – | Ringlet0 | Ringlet0 | Ringlet0 | Ringlet1 | Yes |
| S3 | Ringlet1 | Ringlet1 | – | Ringlet0 | Ringlet0 | Ringlet0 | Yes |
| S4 | Ringlet0 | Ringlet1 | Ringlet1 | – | Ringlet0 | Ringlet0 | Yes |
| S5 | Ringlet0 | Ringlet0 | Ringlet1 | Ringlet1 | – | Ringlet0 | Yes |
| S6 | Ringlet0 | Ringlet0 | Ringlet0 | Ringlet1 | Ringlet1 | – | Yes |

FIG. 7

| VLAN ID (1 to 4094) | Transmission RPR node number | Transmission band | RPR band (guaranteed/ best effort) | Reception RPR node number (multiple numbers possible) |
|---|---|---|---|---|
| 1 | S1 | 400Mbps | Guaranteed | S2,S4 |
| 2 | S2 | 300Mbps | Best effort | S4,S5 |
| 3 | S2 | 100Mbps | Guaranteed | S4,S5 |
| 4 | S3 | 200Mbps | Best effort | S4 |
|  |  |  |  |  |

FIG. 8

| RPR span | Physical band | Empty band | Σ (RPR guaranteed band) | Σ (RPR best effort band) | RPR path band | Σ (SONET/SDH UPSR band) | Σ (SONET/SDH one side path band) |
|---|---|---|---|---|---|---|---|
| S1~S2 | 2.5Gbps | 2.0Gbps | 500Mbps | 0 | 500Mbps | 0 | 0 |
| S2~S3 | 2.5Gbps | 1.7Gbps | 500Mbps | 300Mbps | 800Mbps | 0 | 0 |
| S3~S4 | 2.5Gbps | 1.5Gbps | 500Mbps | 500Mbps | 1Gbps | 0 | 0 |
| S4~S5 | 2.5Gbps | 1.7Gbps | 500Mbps | 300Mbps | 800Mbps | 0 | 0 |
| S5~S6 | 2.5Gbps | 2.0Gbps | 500Mbps | 0 | 500Mbps | 0 | 0 |
| S6~S1 | 2.5Gbps | 2.0Gbps | 500Mbps | 0 | 500Mbps | 0 | 0 |

FIG. 12

| RPR node number | RPR packet transmission direction (Ringlet 0/Ringlet 1) | | | | | | Protection (switching) information |
|---|---|---|---|---|---|---|---|
| | Destination node 1 | Destination node 2 | Destination node 3 | Destination node 4 | Destination node 5 | Destination node 6 | |
| S1 | – | Ringlet0 | Ringlet0 | Ringlet0 | Ringlet1 | Ringlet1 | Yes |
| S2 | Ringlet1 | – | Ringlet0 | Ringlet0 | Ringlet0 | Ringlet1 | Yes |
| S3 | Ringlet1 | Ringlet1 | – | Ringlet0 | Ringlet0 | Ringlet0 | Yes |
| S4 | Ringlet0 | Ringlet1 | Ringlet1 | – | Ringlet0 | Ringlet0 | Yes |
| S5 | Ringlet0 | Ringlet0 | Ringlet1 | Ringlet1 | – | Ringlet0 | Yes |
| S6 | Ringlet0 | Ringlet0 | Ringlet0 | Ringlet1 | Ringlet1 | – | Yes |

FIG. 13

| VLAN ID (1 to 4094) | Transmission RPR node number | Transmission band | RPR band (guaranteed/ best effort) | Reception RPR node number (multiple numbers possible) |
|---|---|---|---|---|
| 1 | S1 | 400Mbps | Guaranteed | S2,S4 |
| 2 | S2 | 300Mbps | Best effort | S4,S5 |
| 3 | S2 | 100Mbps | Guaranteed | S4,S5 |
| 4 | S3 | 200Mbps | Best effort | S4 |
| | | | | |

FIG. 14

| RPR span | Physical band | Empty band | Σ (RPR guaranteed band) | Σ (RPR best effort band) | RPR path band | Σ (SONET /SDH UPSR band) | Σ (SONET /SDH one side path band) |
|---|---|---|---|---|---|---|---|
| S1~S2 | 2.5Gbps | 800Mbps | 500Mbps | 0 | 500Mbps | 600Mbps | 600Mbps |
| S2~S3 | 2.5Gbps | 1.1Gbps | 500Mbps | 300Mbps | 800Mbps | 600Mbps | 0 |
| S3~S4 | 2.5Gbps | 900Mbps | 500Mbps | 500Mbps | 1Gbps | 600Mbps | 0 |
| S4~S5 | 2.5Gbps | 1.1Gbps | 500Mbps | 300Mbps | 800Mbps | 600Mbps | 0 |
| S5~S6 | 2.5Gbps | 800Mbps | 500Mbps | 0 | 500Mbps | 600Mbps | 600Mbps |
| S6~S1 | 2.5Gbps | 650Mbps | 500Mbps | 0 | 500Mbps | 600Mbps | 750Mbps |

FIG. 17

| RPR node number | RPR packet transmission direction (Ringlet 0/Ringlet 1) | | | | | | Protection (switching) information |
|---|---|---|---|---|---|---|---|
| | Destination node 1 | Destination node 2 | Destination node 3 | Destination node 4 | Destination node 5 | Destination node 6 | |
| S1 | – | Ringlet0 | Ringlet0 | Ringlet0 | Ringlet1 | Ringlet1 | No |
| S2 | Ringlet1 | – | Ringlet0 | Ringlet0 | Ringlet0 | Ringlet1 | No |
| S3 | Ringlet1 | Ringlet1 | – | Ringlet0 | Ringlet0 | Ringlet0 | No |
| S4 | Ringlet0 | Ringlet1 | Ringlet1 | – | Ringlet0 | Ringlet0 | No |
| S5 | Ringlet0 | Ringlet0 | Ringlet1 | Ringlet1 | – | Ringlet0 | No |
| S6 | Ringlet0 | Ringlet0 | Ringlet0 | Ringlet1 | Ringlet1 | – | No |

FIG. 18

| VLAN ID (1 to 4094) | Transmission RPR node number | Transmission band | RPR band (guaranteed/ best effort) | Reception RPR node number (multiple numbers possible) |
|---|---|---|---|---|
| 1 | S1 | 400Mbps | Guaranteed | S2,S4 |
| 2 | S2 | 300Mbps | Best effort | S4,S5 |
| 3 | S2 | 100Mbps | Guaranteed | S4,S5 |
| 4 | S3 | 200Mbps | Best effort | S4 |
|   |   |   |   |   |

FIG. 19

| RPR span | Physical band | Empty band | Σ (RPR guaranteed band) | Σ (RPR best effort band) | RPR path band | Σ (SONET/SDH UPSR band) | Σ (SONET/SDH one side path band) |
|---|---|---|---|---|---|---|---|
| S1~S2 | 2.5Gbps | 800Mbps | 400Mbps | 0 | 400Mbps | 600Mbps | 600Mbps |
| S2~S3 | 2.5Gbps | 1.1Gbps | 500Mbps | 300Mbps | 800Mbps | 600Mbps | 0 |
| S3~S4 | 2.5Gbps | 900Mbps | 500Mbps | 500Mbps | 1Gbps | 600Mbps | 0 |
| S4~S5 | 2.5Gbps | 1.5Gbps | 100Mbps | 300Mbps | 400Mbps | 600Mbps | 0 |
| S5~S6 | 2.5Gbps | 1.3Gbps | 0 | 0 | 0 | 600Mbps | 600Mbps |
| S6~S1 | 2.5Gbps | 1.15Gbps | 0 | 0 | 0 | 600Mbps | 750Mbps |

FIG. 21

| RPR node number | RPR packet transmission direction (Ringlet 0/Ringlet 1) | | | | | | Protection (switching) information | Center node information |
|---|---|---|---|---|---|---|---|---|
| | Destination node 1 | Destination node 2 | Destination node 3 | Destination node 4 | Destination node 5 | Destination node 6 | | |
| S1 | - | Ringlet0 | Ringlet0 | Ringlet0 | Ringlet1 | Ringlet1 | Yes | Invalid |
| S2 | Ringlet1 | - | Ringlet0 | Ringlet0 | Ringlet0 | Ringlet1 | Yes | Invalid |
| S3 | Ringlet1 | Ringlet1 | - | Ringlet0 | Ringlet0 | Ringlet0 | Yes | Invalid |
| S4 | Ringlet0 | Ringlet1 | Ringlet1 | - | Ringlet0 | Ringlet0 | Yes | Invalid |
| S5 | Ringlet0 | Ringlet0 | Ringlet1 | Ringlet1 | - | Ringlet0 | Yes | Invalid |
| S6 | Ringlet0 | Ringlet0 | Ringlet0 | Ringlet1 | Ringlet1 | - | Yes | Invalid |

FIG. 22

| VLAN ID (1 to 4094) | Transmission RPR node number | Transmission band | RPR band (guaranteed/ best effort) | Reception RPR node number (multiple numbers possible) |
|---|---|---|---|---|
| 1 | S1 | 400Mbps | Guaranteed | S2,S4 |
| 2 | S2 | 300Mbps | Best effort | S4,S5 |
| 3 | S2 | 100Mbps | Guaranteed | S4,S5 |
| 4 | S3 | 200Mbps | Best effort | S4 |
| | | | | |

FIG. 23

| RPR span | Physical band | Empty band | Σ (RPR guaranteed band) | Σ (RPR best effort band) | RPR path band | Σ (SONET /SDH UPSR band) | Σ (SONET /SDH one side path band) |
|---|---|---|---|---|---|---|---|
| S1~S2 | 2.5Gbps | 2.0Gbps | 500Mbps | 0 | 500Mbps | 0 | 0 |
| S2~S3 | 2.5Gbps | 1.7Gbps | 500Mbps | 300Mbps | 800Mbps | 0 | 0 |
| S3~S4 | 2.5Gbps | 1.5Gbps | 500Mbps | 500Mbps | 1Gbps | 0 | 0 |
| S4~S5 | 2.5Gbps | 2.5Gbps | 0 | 0 | 0 | 0 | 0 |
| S5~S6 | 2.5Gbps | 2.5Gbps | 0 | 0 | 0 | 0 | 0 |
| S6~S1 | 2.5Gbps | 2.5Gbps | 0 | 0 | 0 | 0 | 0 |

FIG. 25

| RPR node number | RPR packet transmission direction (Ringlet 0/Ringlet 1) ||||||| Protection (switching) information | Multi-ring connection information |
|---|---|---|---|---|---|---|---|---|
| | Destination node 1 | Destination node 2 | Destination node 3 | Destination node 4 | Destination node 5 | Destination node 6 | | |
| S1 | – | Ringlet0 | Ringlet0 | Ringlet0 | Ringlet1 | Ringlet1 | Yes | Invalid |
| S2 | Ringlet1 | – | Ringlet0 | Ringlet0 | Ringlet0 | Ringlet1 | Yes | Invalid |
| S3 | Ringlet1 | Ringlet1 | – | Ringlet0 | Ringlet0 | Ringlet0 | Yes | Invalid |
| S4 | Ringlet0 | Ringlet1 | Ringlet1 | – | Ringlet0 | Ringlet0 | Yes | Invalid |
| S5 | Ringlet0 | Ringlet0 | Ringlet1 | Ringlet1 | – | Ringlet0 | Yes | Invalid |
| S6 | Ringlet0 | Ringlet0 | Ringlet0 | Ringlet1 | Ringlet1 | – | Yes | Valid |

FIG. 26

| RPR node number | RPR packet transmission direction (Ringlet 0/Ringlet 1) | | | | | Protection (switching) information | Multi-ring connection information |
|---|---|---|---|---|---|---|---|
| | Destination node 6 | Destination node 7 | Destination node 8 | Destination node 9 | Destination node n | | |
| S6 | – | Ringlet0 | Ringlet0 | Ringlet0 | – | Yes | Valid |
| S7 | Ringlet1 | – | Ringlet0 | Ringlet0 | – | Yes | Invalid |
| S8 | Ringlet1 | Ringlet0 | – | Ringlet0 | – | Yes | Invalid |
| S9 | Ringlet0 | Ringlet1 | Ringlet1 | – | – | Yes | Invalid |
| | | | | | | | |

FIG. 27

| VLAN ID (1 to 4094) | Transmission RPR node number | Transmission band | RPR band (guaranteed/ best effort) | Reception RPR node number (multiple numbers possible) |
|---|---|---|---|---|
| 1 | S1 | 400Mbps | Guaranteed | S2,S4 |
| 2 | S2 | 300Mbps | Best effort | S4,S5 |
| 3 | S2 | 100Mbps | Guaranteed | S4,S5 |
| 4 | S3 | 200Mbps | Best effort | S4 |
|  |  |  |  |  |

FIG. 28

| VLAN ID (1 to 4094) | Transmission RPR node number | Transmission band | RPR band (guaranteed/ best effort) | Reception RPR node number (multiple numbers possible) |
|---|---|---|---|---|
| 10 | S9 | 500Mbps | Best effort | S7 |
| 11 | S8 | 800Mbps | Guaranteed | S7 |
|  |  |  |  |  |

FIG. 29

| RPR span | Physical band | Empty band | Σ (RPR guaranteed band) | Σ (RPR best effort band) | RPR path band | Σ (SONET/ SDH UPSR band) | Σ (SONET/ SDH one side path band) |
|---|---|---|---|---|---|---|---|
| S1~S2 | 2.5Gbps | 1.4Gbps | 500Mbps | 0 | 500Mbps | 600Mbps | 0 |
| S2~S3 | 2.5Gbps | 1.1Gbps | 500Mbps | 300Mbps | 800Mbps | 600Mbps | 0 |
| S3~S4 | 2.5Gbps | 900Mbps | 500Mbps | 500Mbps | 1Gbps | 600Mbps | 0 |
| S4~S5 | 2.5Gbps | 1.1Gbps | 500Mbps | 300Mbps | 800Mbps | 600Mbps | 0 |
| S5~S6 | 2.5Gbps | 1.4Gbps | 500Mbps | 0 | 500Mbps | 600Mbps | 0 |
| S6~S1 | 2.5Gbps | 1.2Gbps | 500Mbps | 0 | 500Mbps | 600Mbps | 150Mbps |

FIG. 30

| RPR span | Physical band | Empty band | Σ (RPR guaranteed band) | Σ (RPR best effort band) | RPR path band | Σ (SONET/ SDH UPSR band) | Σ (SONET/ SDH one side path band) |
|---|---|---|---|---|---|---|---|
| S6~S7 | 2.5Gbps | 1.1Gbps | 800Mbps | 0 | 800Mbps | 600Mbps | 0 |
| S7~S8 | 2.5Gbps | 600Mbps | 800Mbps | 500Mbps | 1.3Gbps | 600Mbps | 0 |
| S8~S9 | 2.5Gbps | 600Mbps | 800Mbps | 500Mbps | 1.3Gbps | 600Mbps | 0 |
| S9~S6 | 2.5Gbps | 950Mbps | 800Mbps | 0 | 800Mbps | 600Mbps | 150Mbps |

BAND MANAGEMENT APPARATUS AND BAND MANAGEMENT METHOD

BACKGROUND

The present invention relates to a band management apparatus and a band management method that manage a communication band of a transmission path between data relay devices in a ring network.

DESCRIPTION OF THE RELATED ART

To date, a technology has existed that manages a band of each transmission path in a ring network configured to share the same physical band between a SONET (Synchronous Optical Network)/SDH (Synchronous Digital Hierarchy) path (a transmission path), and an RPR (Resilient Packet Ring) path, which has the SONET/SDH as a physical layer.

In the ring network, in a case in which a protection configuration with the SONET/SDH is adopted, a fixed backup band identical to the SONET/SDH path is secured in a whole ring. Also, it is normal that the RPR path that has the SONET/SDH as the physical layer, with two optical rings, which rotate in opposite directions, secures the same SONET/SDH band for both directions, and sets in advance a fixed best effort band and a guaranteed band. Then, the band of each transmission path is managed by adjusting up or down an overall band of the RPR ring in such a way that a sum of CIR's (Committed Information Rates) flowing in from each RPR device (a node installed between the paths) does not exceed the physical SONET/SDH band.

Also, an RPR network system that, collecting and monitoring setting conditions of the CIR's (Committed Information Rates) from the communication nodes installed between the paths, manages in such a way that the sum of the CIR's collected from the communication nodes does not exceed the physical SONET (Synchronous Optical Network)/SDH (Synchronous Digital Hierarchy) band, is disclosed in JP-A-2006-261825.

The heretofore described known technology has the following kind of problem.

In the case in which the protection configuration with the SONET/SDH is adopted, as well as the fixed backup band identical to the SONET/SDH path being secured in the whole ring, as the best effort band and guaranteed band are set in advance in the RPR path too, there is a problem in that it is not possible to effectively utilize the physical band of the transmission path.

SUMMARY

According to an aspect of an embodiment, a band management apparatus that manages a communication band of a transmission path between data relay devices in a ring network comprises a hypothetical network management information storage unit that stores information on the communication band set for the transmission path for each hypothetical network set in such a way as to include the data relay devices, a communication band calculator that calculates the communication band for each transmission path between neighboring data relay devices contiguously connected without sandwiching another data relay device, based on the information stored by the hypothetical network management information storage unit, and a communication band setting unit that individually sets each communication band calculated by the communication band calculator as the communication band of the transmission path between the neighboring data relay devices.

BRIEF DESCRIPTION OF THE DRAWINGS

FIG. 3 is a diagram showing an example of a configuration of a VLAN management DB according to the first embodiment;

FIG. 6 is a diagram showing an example of a configuration of a node information management DB according to the first embodiment;

FIG. 7 is a diagram showing an example of a configuration of the VLAN management DB according to the first embodiment;

FIG. 8 is a diagram showing an example of a configuration of an RPR span band management DB according to the first embodiment;

FIG. 12 is a diagram showing an example of a configuration of a node information management DB according to the second embodiment;

FIG. 13 is a diagram showing an example of a configuration of a VLAN management DB according to the second embodiment;

FIG. 14 is a diagram showing an example of a configuration of an RPR span band management DB according to the second embodiment;

FIG. 17 is a diagram showing an example of a configuration of a node information management DB according to the third embodiment;

FIG. 18 is a diagram showing an example of a configuration of a VLAN management DB according to the third embodiment;

FIG. 19 is a diagram showing an example of a configuration of an RPR span band management DB according to the third embodiment;

FIG. 21 is a diagram showing an example of a configuration of a node information management DB according to the fourth embodiment;

FIG. 22 is a diagram showing an example of a configuration of a VLAN management DB according to the fourth embodiment;

FIG. 23 is a diagram showing an example of a configuration of an RPR span band management DB according to the fourth embodiment;

FIG. 25 is a diagram showing an example of a configuration of a node information management DB (ring 1) according to the fourth embodiment;

FIG. 26 is a diagram showing an example of a configuration of a node information management DB (ring 2) according to the fourth embodiment;

FIG. 27 is a diagram showing an example of the configuration of the VLAN management DB (ring 1) according to the fourth embodiment;

FIG. 28 is a diagram showing an example of the configuration of the VLAN management DB (ring 2) according to the fourth embodiment;

FIG. 29 is a diagram showing an example of the configuration of the RPR span band management DB (ring 1) according to the fourth embodiment;

FIG. 30 is a diagram showing an example of the configuration of the RPR span band management DB (ring 2) according to the fourth embodiment.

DETAILED DESCRIPTION OF THE EMBODIMENTS

Hereafter, a detailed description will be given of embodiments of a band management apparatus and band management method according to the invention, referring to the attached diagrams. Thereafter, after describing the band management apparatus according to the invention as a first embodiment, other embodiments included in the invention will be described.

Explanation of Terminology

Firstly, a description will be given of the main terminology used in the embodiments. A "SONET (Synchronous Optical Network)/SDH (Synchronous Digital Hierarchy)" used in the embodiments is one of the high speed digital communication methods that use optical fibers, a "SONET/SDH path" is a transmission path that is set based on this communication method.

Also, an "RPR" used in the embodiments is a MAC (Media Access Control) protocol that operates at a second layer (layer 2) level of the OSI reference model, which is a network structure design method for realizing data communication between different models established in accordance with the International Organization for Standardization (ISO), an "RPR path" is a transmission path that is set based on the RPR.

First Embodiment

In the following first embodiment, an outline and features of a band management apparatus, and a configuration and processes of the band management apparatus, according to the first embodiment will be described in order, and lastly, an advantage of the first embodiment will be described.

Outline of Band Management Apparatus (First Embodiment)

Figure 1:
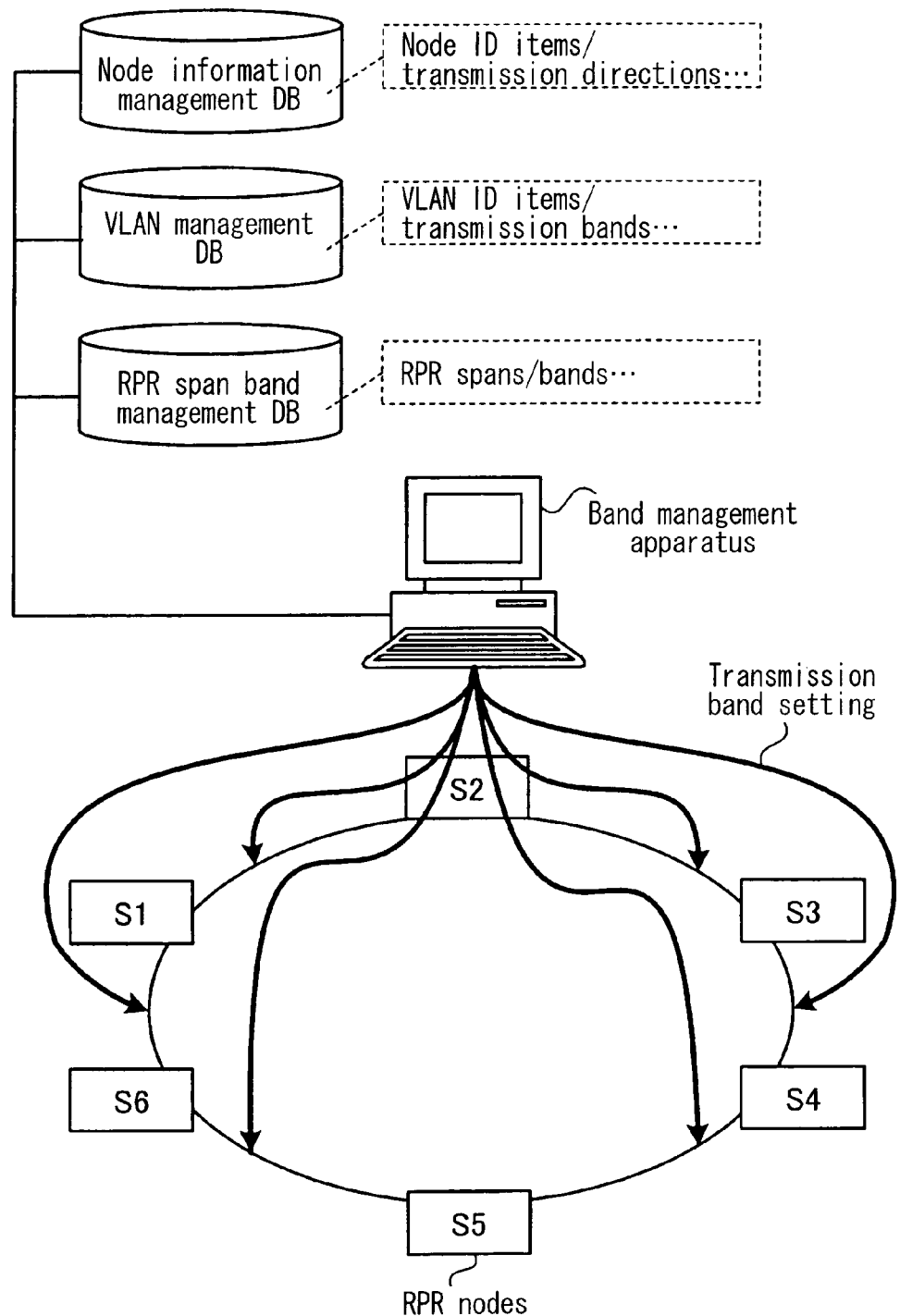
FIG. 1 is a diagram showing an outline of a band management apparatus according to a first embodiment.
Figure 2:
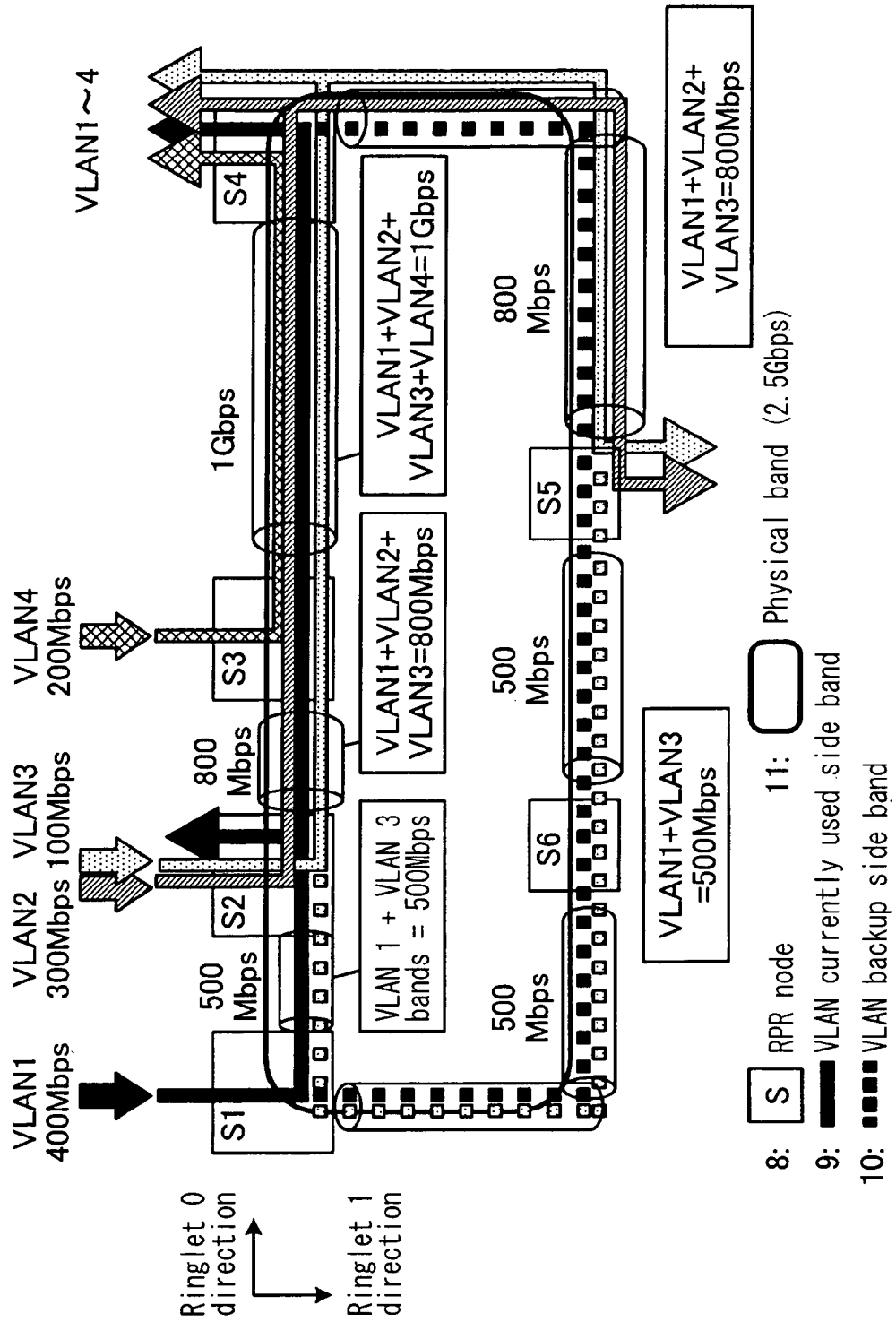
FIG. 2 is a diagram for illustrating features of the first embodiment.
Figure 4:
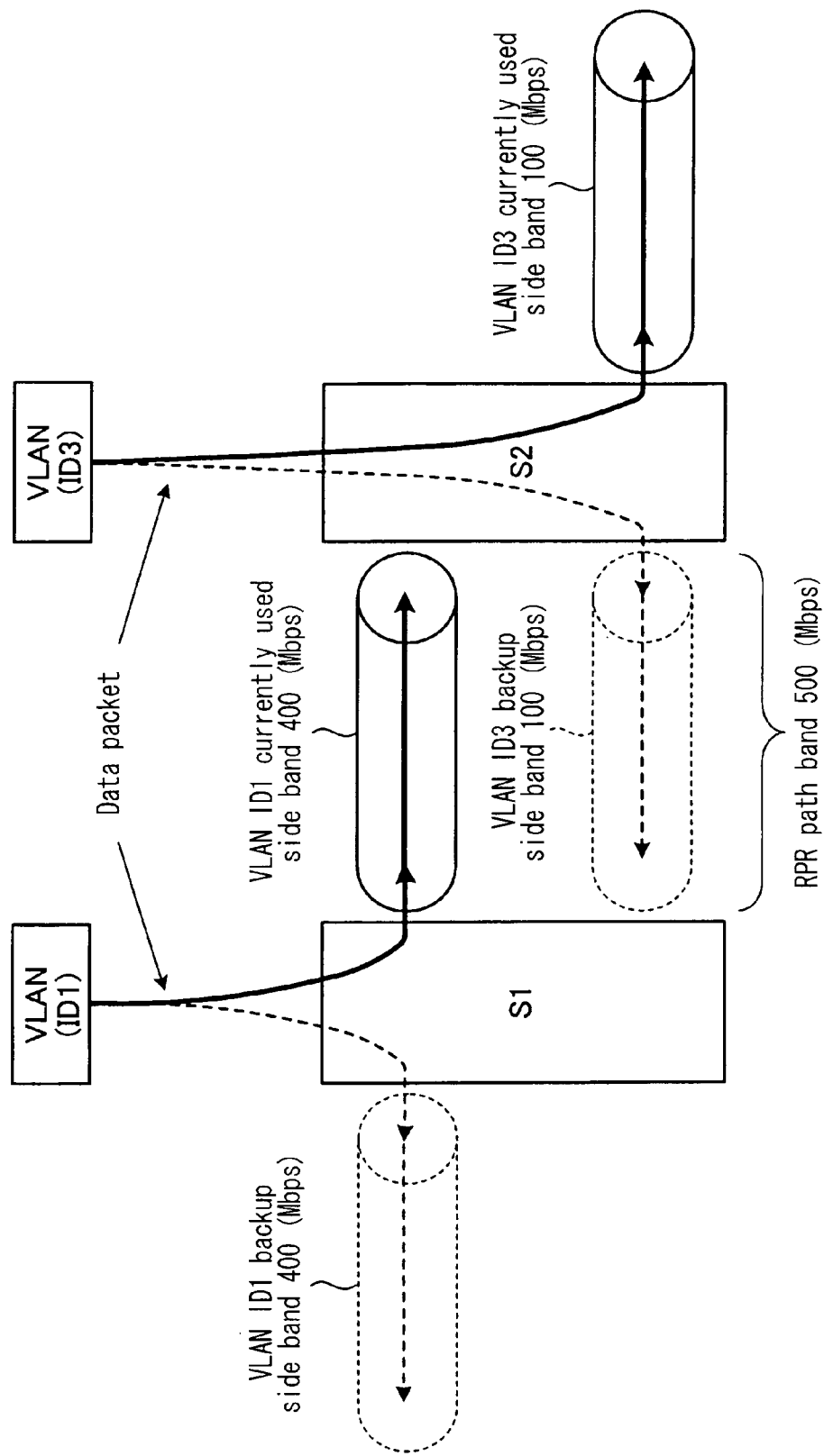
FIG. 4 is a diagram showing an example of a calculation of an RPR path band according to the first embodiment.

Firstly, a description will be given of the outline of the band management apparatus according to the first embodiment, using FIGS. 1 to 4. FIG. 1 is a diagram illustrating the outline of the band management apparatus according to the first embodiment. FIG. 2 is a diagram illustrating the outline and features of the first embodiment. FIG. 3 is a diagram showing an example of a configuration of a VLAN management DB according to the first embodiment. FIG. 4 is a diagram showing an example of a calculation of an RPR path band according to the first embodiment.

The outline of the band management apparatus according to the first embodiment is that it manages a communication band of a transmission path between data relay devices (nodes) in a ring network. A main feature thereof is that, it being possible to accurately manage a communication band for a transmission path between neighboring data relay devices (for example, between nodes that are contiguously connected without sandwiching another node), it is possible to set an optimum communication band for each transmission path.

A specific description will be given of the above mentioned feature.

As shown in FIG. 1, in the ring network, the band management apparatus according to the first embodiment, as well as having a SONET/SDH as a physical layer, is equipped in advance with a node information management DB, the VLAN management DB, and an RPR span band management DB, for managing an RPR path band, set between nodes, based on an RPR.

The node information management DB is configured for storing a packet transmission direction for each node set at a time of registering the ring network. Specifically, it is configured for storing, for each item of node ID (node number) that identifies nodes (S1 to S6) disposed as the data relay devices on the ring network, a transmission direction of packet data with respect to other nodes.

The VLAN management DB, which receives setting information from a manager, is configured for storing information relating to a VLAN (Virtual LAN) set in such a way as to include the nodes disposed on the ring network. Specifically, as shown in FIG. 3, it is configured for storing, for each item of ID for identifying the VLAN, a transmission RPR node number, which is a source of the packet data, a transmission band of a transmission path for transmitting the packet data, a category of an RPR band for transmitting the packet data (a guaranteed band or a best effort band), and a receiving RPR node number, which is a recipient of the packet data.

The RPR span management information DB is configured for storing bands, such as the RPR path band set in a transmission path between the nodes (an RPR span). Specifically, the RPR span management information DB is configured for storing, for each RPR span that is composed of node numbers (such as S1 to S2), a physical band, the RPR path band, an empty band in the physical band, and the like.

Also, the band management apparatus, on receiving the VLAN setting information (refer to FIG. 3) from the manager or the like, calculates the communication band (the RPR path band) for each pair of neighboring nodes (the RPR span), based on the VLAN information, as illustrated in FIG. 2. Hereafter, with regard to an RPR band that makes a band category secured when transmitting the packet data the guaranteed band, a description will be given of a case of securing a transmission band of a backup side (a backup side band) for switching to in the event of a problem occurring in a transmission band of a currently used side (a currently used side band).

That is, the band management apparatus, with regard to the RPR band that makes the band category the guaranteed band, holding in advance information to the effect that the transmission band of the backup side (the backup side band) is to be secured, calculates the RPR path band for each transmission path between the neighboring nodes (between the nodes that are contiguously connected without sandwiching another node), based on the VLAN information (information on a transmission band of a transmission path, for transmitting packet data, set between the transmission RPR node number, which is the source of the packet data, and the receiving RPR node number, which is the recipient of the packet data) retrieved from the VLAN management DB (refer to FIG. 3).

For example, the band management apparatus, as illustrated in FIG. 4, based on the VLAN information retrieved from the VLAN management DB (refer to FIG. 3), calculates that an RPR path band of the neighboring node pair, which is composed of the node S1 and the node S2, is, adding 400 (Mbps) of the currently used side band and 100 (Mbps) of the backup side band, 500 (Mbps). Also, the band management apparatus manages each calculated RPR path band by storing it in the RPR span band management DB.

After calculating the RPR path band for each transmission path between the neighboring nodes, the band management apparatus sets each of the calculated RPR path bands as an RPR path band of a transmission path between the neighboring nodes.

As heretofore described, with the band management apparatus according to the first embodiment, it being possible to accurately manage the communication band for the transmission path between the neighboring data relay devices (between the nodes that are contiguously connected without sandwiching another node), it is possible to set the optimum communication band for each transmission path.

Configuration of Band Management Apparatus (First Embodiment)

Figure 5:
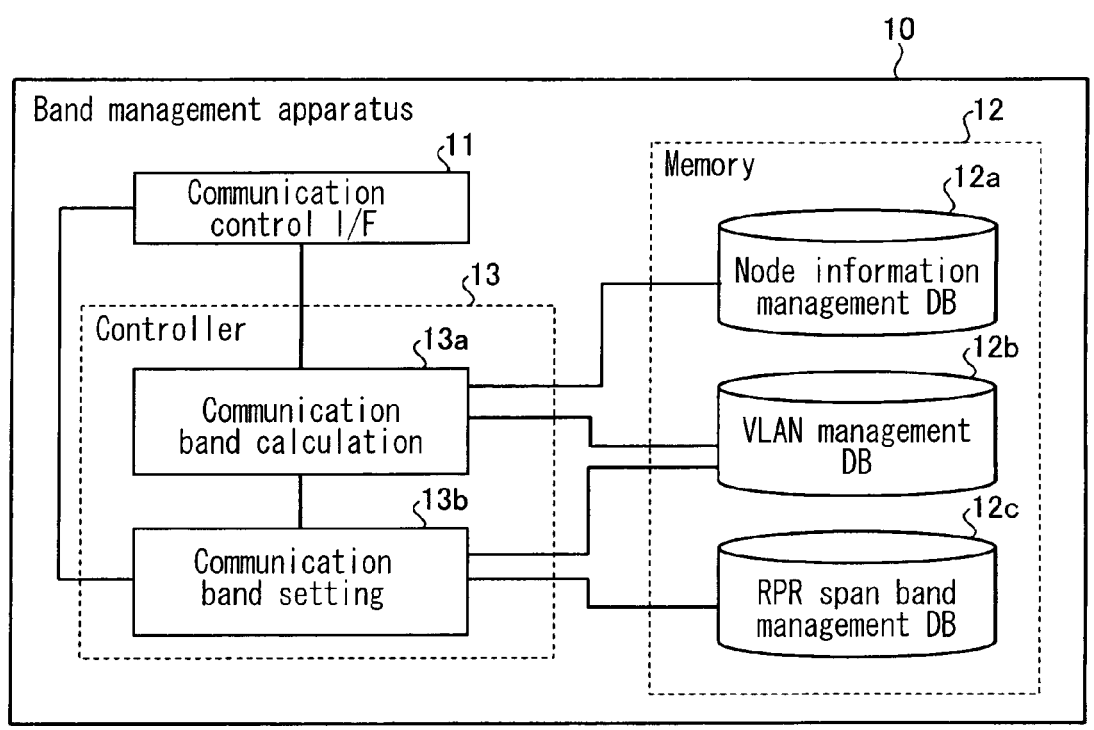
FIG. 5 is a block diagram showing a configuration of the band management apparatus according to the first embodiment.

Next, using FIG. 5, a description will be given of the configuration of the band management apparatus according to the first embodiment. FIG. 5 is a block diagram showing the configuration of the band management apparatus according to the first embodiment.

As shown in the figure, the band management apparatus 10 according to the first embodiment is configured with a communication control I/F 11, a memory 12, and a controller 13. Of these, the communication control I/F 11 controls communication of various kinds of information transferred between various node devices disposed on the ring network.

The memory 12 is a memory that stores programs and data necessary for various kinds of processes carried out by the controller 13. Its being an item particularly closely related to the invention lies in an inclusion of a node information management DB 12a, a VLAN management DB 12b, and an RPR span band management DB 12c.

The node information management DB 12a is configured for storing the packet transmission direction for each node set at the time of registering the ring network. Specifically, as illustrated in FIG. 6, it is configured for storing, for each node number that identifies nodes (S1 to S6) disposed as the data relay devices on the ring network, a transmission direction of packet data with respect to other nodes (for example, "Ringlet 0" in the event that it is a clockwise direction, and "Ringlet 1" in the event that it is a counter-clockwise direction). In the case of securing the transmission band of the backup side for switching to in the event of a problem occurring in the transmission band of the currently used side, "Yes" is stored as protection (switching) information for each node number.

The VLAN management DB 12b, receiving the setting information from a manager of the band management apparatus 10, is configured for storing the information relating to the VLAN (the Virtual LAN) set in such a way as to include the nodes disposed on the ring network. Specifically, as illustrated in FIG. 7, it is configured for storing, for each item of ID affixed for identifying the VLAN, the transmission RPR node number (for example, S1, S2 etc.), which is the source of the packet data, the transmission band of the transmission path (the RPR path) for transmitting the packet data, the category of the RPR band for transmitting the packet data (the guaranteed band or the best effort band), and the receiving RPR node number (for example, S1, S2 etc.), which is the recipient of the packet data. "Guaranteed" means to secure a constant band (a data width) for the transmission of the packet data, without being affected by a data packet transmitted from elsewhere, "best effort" means to secure, as far as possible, a band for the transmission of the packet data.

The RPR span band management DB 12c is configured for storing the bands, such as the RPR path band set in the transmission path between the nodes (the RPR span). Specifically, as illustrated in FIG. 8, the RPR span management information DB 12c is configured for storing, for each RPR span that is composed of the node numbers (for example, S1 to S2, S2 to S3 etc.), the physical band, the empty band in the physical band, a sum of the RPR guaranteed bands, a sum of the RPR best effort bands, the RPR path band, and the like. In the first embodiment, as a SONET/SDH UPSR band, and a SONET/SDH UPSR one side path band are not set, each band is "0".

The controller 13 is a processor that, having an internal memory for storing a predetermined control program, a program that regulates various kinds of processing procedure and the like, and necessary data, executes various kinds of process by means thereof, it includes a communication band calculator 13a and a communication band setting unit 13b as items particularly closely related to the invention.

Of these, the communication band calculator 13a is a processor that calculates the communication band (the RPR path band) for each RPR path, based on the VLAN information (refer to FIG. 2). Hereafter, the RPR band that makes the category the guaranteed band will be described, offering as an example the case of securing the transmission band of the backup side (the backup side band) for switching to in the event of a problem occurring in the transmission band of the currently used side (the currently used side band).

That is, the communication band calculator 13a, with regard to the RPR band that makes the band category the guaranteed band, holding in advance the information to the effect that the transmission band of the backup side (the backup side band) is to be secured, calculates the RPR path band for each transmission path between the neighboring nodes (that is, between the nodes that are contiguously connected without sandwiching another node, that is, the RPR span), based on the VLAN information (information on a transmission band of a transmission path, for transmitting packet data, set between the transmission RPR node number, which is the source of the packet data, and the receiving RPR node number, which is the recipient of the packet data) retrieved from the VLAN management DB 12b (refer to FIG. 7).

For example, the communication band calculator 13a, based on the VLAN information retrieved from the VLAN management DB 12b (refer to FIG. 7), calculates that an RPR path band of the neighboring node pair that is composed of the node S1 and the node S2 is, adding 400 (Mbps) of the currently used side band and 100 (Mbps) of the backup side band, 500 (Mbps).

Also, the communication band calculator 13a, as well as storing each calculated RPR path band in the RPR span band management DB 12c, transmits it to the communication band setting unit 13b.

The communication band setting unit 13b is a processor that sets the RPR path band. Specifically, on receiving the RPR path band calculated for each transmission path (RPR path) between the neighboring nodes from the communication band calculator 13a, the communication band setting unit 13*b* sets each of the calculated RPR path bands as the RPR path band of the transmission path between the neighboring nodes.

Also, the communication band setting unit 13*b*, on receiving the VLAN setting information via the communication control I/F 11 from, for example, the manager of the band management apparatus 10, stores the VLAN setting information in the VLAN management DB 12*b*.

Band Management Apparatus Processes (First Embodiment)

Figure 9:
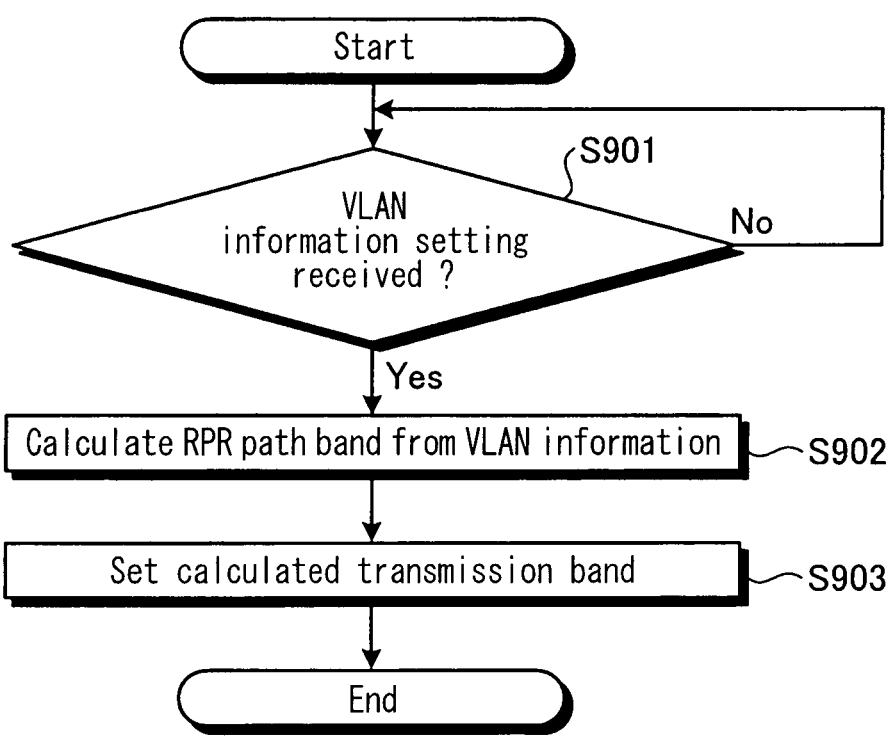
FIG. 9 is a flowchart showing a flow of processes of the band management apparatus according to the first embodiment.

Continuing, a description will be given of the processes of the band management apparatus according to the first embodiment, using FIG. 9. FIG. 9 is a flowchart showing a flow of the processes of the band management apparatus according to the first embodiment.

For example, on receiving the VLAN setting information via the communication control I/F 11 from, for example, the manager of the band management apparatus 10 (step S901), the communication band setting unit 13*b* stores the VLAN setting information in the VLAN management DB 12*b*. Also, the communication band calculator 13*a* calculates the communication band (the RPR path band), for each RPR path, from the VLAN information (step S902).

To describe specifically, the communication band calculator 13*a*, with regard to the RPR band that makes the band category the guaranteed band, holding in advance the information to the effect that the transmission band of the backup side (the backup side band) is to be secured, calculates the RPR path band for each transmission path between the neighboring nodes (that is, between the nodes that are contiguously connected without sandwiching another node, that is, the RPR span), based on the VLAN information (information on a transmission band of a transmission path, for transmitting packet data, set between the transmission RPR node number, which is the source of the packet data, and the receiving RPR node number, which is the recipient of the packet data) retrieved from the VLAN management DB 12*b* (refer to FIG. 7). For example, the communication band calculator 13*a*, based on the VLAN information retrieved from the VLAN management DB 12*b*, calculates that an RPR path band of the neighboring node pair that is composed of the node S1 and the node S2 is, adding 400 (Mbps) of the currently used side band and 100 (Mbps) of the backup side band, 500 (Mbps).

After calculating the RPR path band for each transmission path (RPR path) between the neighboring nodes, the communication band calculator 13*a*, as well as storing each calculated RPR path band in the RPR span band management DB 12*c*, transmits it to the communication band setting unit 13*b*.

Then, the communication band setting unit 13*b* sets the RPR path band (step S903). Specifically, on receiving the RPR path band calculated for each transmission path (RPR path) between the neighboring nodes from the communication band calculator 13*a*, the communication band setting unit 13*b* sets each of the calculated RPR path bands as the RPR path band of the transmission path between the neighboring nodes.

Advantage of First Embodiment

As heretofore described, according to the first embodiment, in the case of managing the RPR path band of the ring network set between the nodes, based on the RPR, with the SONET/SDH as the physical layer, the information on the communication band (the VLAN information) for the transmission path between the nodes being stored for each VLAN set in such a way as to include the nodes, as well as the communication band being calculated, based on the stored information on the communication band (the VLAN information), for each transmission path between the neighboring nodes that are contiguously connected without sandwiching another node, it is set as the communication band of the transmission path established between the neighboring nodes. Therefore, it being possible to accurately manage the communication band for the transmission path between the neighboring nodes (for example, between the nodes that are contiguously connected without sandwiching another node, that is, the RPR span), it is possible to set the optimum communication band for each transmission path. Also, as a result of it being possible to set the optimum communication band between the neighboring data relay devices, it is possible to effectively utilize the physical band of the transmission path.

Also, according to the first embodiment, backup band setting information, relating to whether or not a communication band of a backup system for the RPR path is set, being stored, the communication band of the transmission path is calculated, based on the stored backup band setting information and the information on the communication band (the VLAN information), for each pair of neighboring nodes, by adding a currently used system and the backup system. Therefore, in the case in which, as well as a communication band of the currently used system being set in the RPR path, the communication band of the backup system is set, it being possible to more accurately calculate the transmission path between the neighboring nodes, including the communication band of the backup system, it is possible to set a more appropriate communication band for each transmission path. Also, as a result of it being possible to set the more appropriate communication band between the neighboring nodes, it is possible to more effectively utilize the physical band of the transmission path.

Second Embodiment

Although, in the heretofore described first embodiment, the description is given, for the ring network in which the RPR path is set with the SONET/SDH as the physical layer, of the case in which the RPR path band is calculated from the VLAN setting information, received from the manager or the like, and set, the invention not being limited to this, it is also acceptable to arrange in such a way that, further calculating the empty band in the physical band, a transmission path based on the SONET/SDH is set in the empty band. Therein, in a following second embodiment, an outline and features of a band management apparatus, and a configuration and processes of the band management apparatus, according to the second embodiment will be described in order, and lastly, an advantage of the second embodiment will be described.

Outline and Features of Band Management Apparatus (Second Embodiment)

Figure 10:
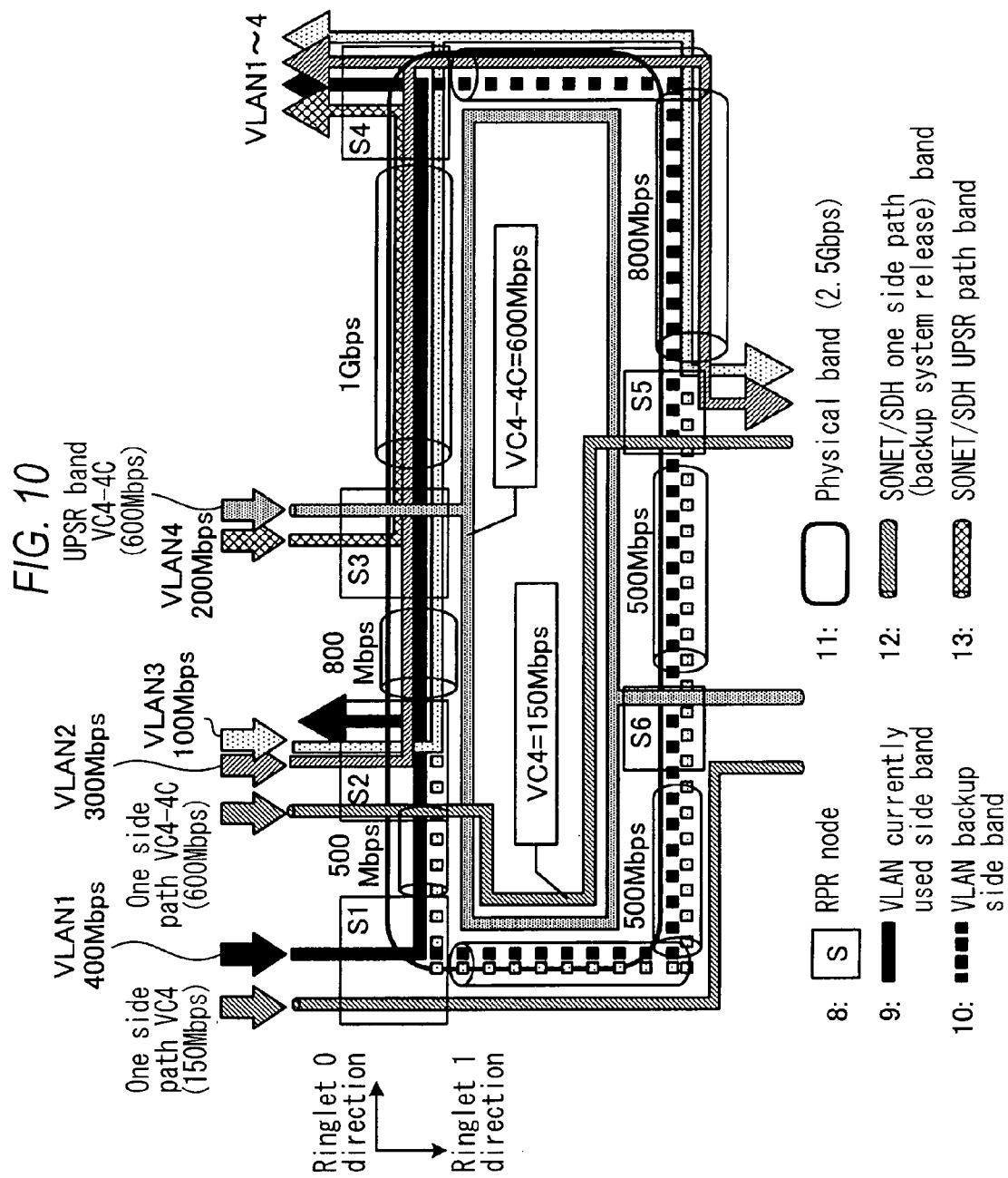
FIG. 10 is a diagram for illustrating an outline and features of a second embodiment.
Figure 11:
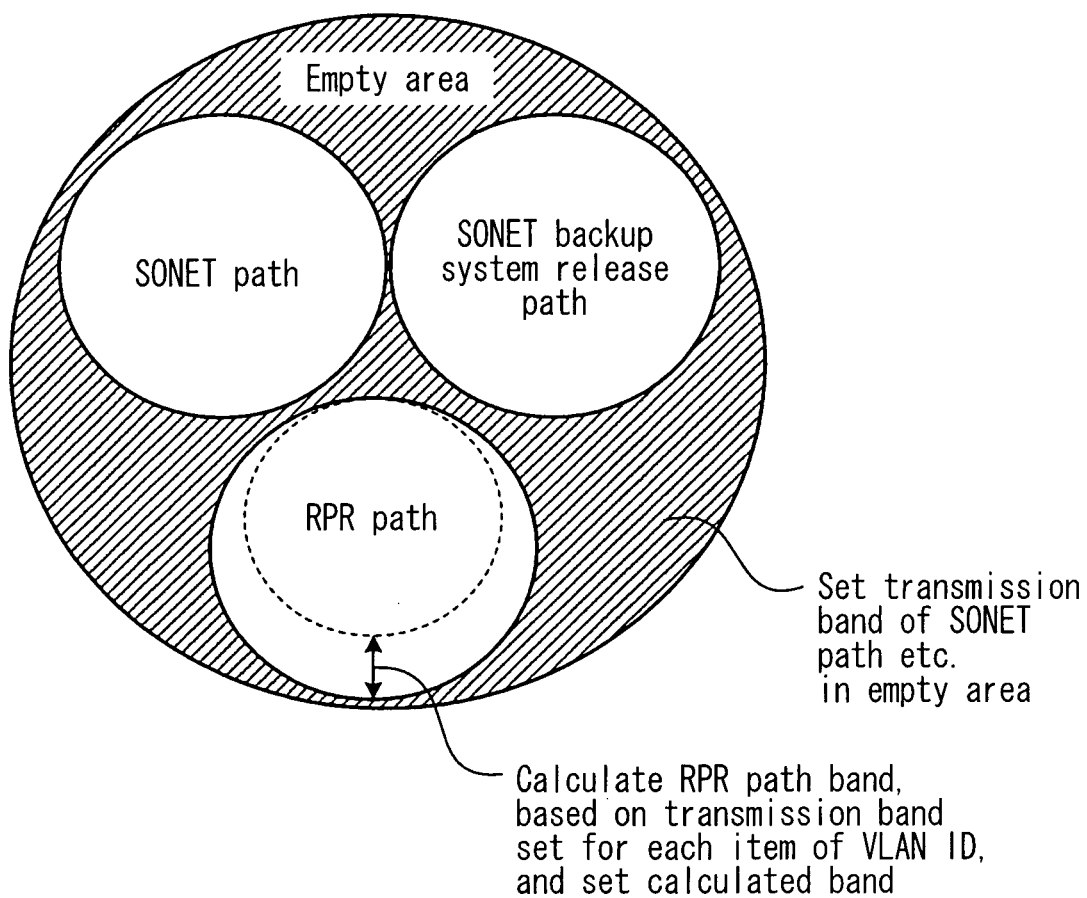
FIG. 11 is a conceptual diagram showing the features of the second embodiment.

Firstly, a description will be given of the outline and features of the band management apparatus according to the second embodiment, using FIGS. 10 to 14. FIG. 10 is a diagram illustrating the outline and features of the second embodiment. FIG. 11 is a conceptual diagram showing the features of the second embodiment. FIG. 12 is a diagram showing an example of a configuration of a node information management DB according to the second embodiment. FIG. 13 is a diagram showing an example of a configuration of a VLAN management DB according to the second embodiment. FIG. 14 is a diagram showing an example of a configuration of an RPR span band management DB according to the second embodiment.

The outline of the band management apparatus according to the second embodiment, in the same way as that of the heretofore described first embodiment, is that it manages the communication band of the transmission path between the data relay devices (the nodes) in the ring network. A main feature thereof lies in it being possible to effectively use the empty band in the physical band of the transmission path.

To give a specific description of the main feature, the band management apparatus according to the second embodiment, in the same way as the band management apparatus according to the first embodiment, is equipped in advance with the node information management DB, the VLAN management DB, and the RPR span band management DB.

The node information management DB, in the same way as that of the first embodiment, is configured for storing the packet transmission direction for each node set at the time of registering the ring network (refer to FIG. 12). Also, the VLAN management DB, in the same way as that of the first embodiment, receiving the setting information from the manager, is configured for storing the information relating to the VLAN (the Virtual LAN) set in such a way as to include the nodes disposed on the ring network (refer to FIG. 13).

Although the RPR span management information DB, in the same way as that of the first embodiment, is configured for storing the bands, such as the RPR path band set in the transmission path between the nodes (the RPR span), the RPR span management information DB is configured for storing not only, for each RPR span that is composed of the node numbers (such as, for example, S1 to S2), the physical band, the RPR path band, and the empty band in the physical band, but also the SONET/SDH UPSR band and the SONET/SDH one side path band (refer to FIG. 14).

Herein, the SONET/SDH UPSR (Unidirectional Path Switched Ring) band is a communication band set in the transmission paths (SONET paths) of the currently used side and the backup side, based on the SONET/SDH, by employing a method (UPSR) of switching to the transmission path of the backup side in the event of a failure occurring in the transmission path of the currently used side. Also, the SONET/SDH one side path band is a communication band set only in the transmission path (a SONET backup release system path) of the currently used side, based on the SONET/SDH, without employing the UPSR.

Then, the band management apparatus according to the second embodiment, in the same way as that described in the first embodiment, after calculating the communication band (the RPR path band) for each RPR path, based on the VLAN information, as shown in FIG. 10, calculates the empty band in the physical band of the transmission path. Specifically, the band management apparatus calculates the empty band in the physical band of the transmission path by taking, for each transmission path between the neighboring nodes (between the nodes that are contiguously connected without sandwiching another node, that is, the RPR span), a difference between the physical band of the transmission path, retrieved from the RPR span band management DB, and the RPR path band.

For example, in a case in which the physical band of the neighboring node pair, which is composed of the node S1 and the node S2, retrieved from the RPR span band management DB, is 2.5 (Gbps), and the RPR path band of the neighboring node pair is 500 (Mbps), the empty band in the physical band of the transmission path is 2.0 (Gbps).

Then, the band management apparatus according to the second embodiment sets the bands of the SONET/SDH UPSR (the SONET path) and the SONET/SDH one side path (the SONET backup system release path) for the calculated empty band of the transmission path, as illustrated in FIG. 11. This is what is meant by effectively using the empty band of the transmission path.

For example, in a case in which the empty band of the neighboring node pair, which is composed of the node S1 and the node S2 is 2.0 (Gbps), the bands of the SONET/SDH UPSR and the SONET/SDH one side path are set at 600 (Mbps) each for the empty band of the transmission path, and each setting value is stored in the RPR span band management DB.

After setting the bands of the SONET/SDH UPSR and the SONET/SDH one side path, the band management apparatus according to the second embodiment calculates and stores a final empty band. For example, in the case in which the empty band of the neighboring node pair, which is composed of the node S1 and the node S2 is 2.0 (Gbps), and the bands of the SONET/SDH UPSR and the SONET/SDH one side path are 600 (Mbps) each, the final empty band is 800 (Mbps).

By such means, the band management apparatus according to the second embodiment can effectively use the empty band in the physical band of the transmission path.

Configuration of Band Management Apparatus (Second Embodiment)

Next, using FIG. 5, a description will be given of the configuration of the band management apparatus according to the second embodiment. Although the band management apparatus according to the second embodiment has basically the same configuration as that of the band management apparatus according to the first embodiment, the points described hereafter are different.

That is, although the RPR span band management DB 12c shown in FIG. 5 is configured for storing the bands, such as the RPR path band set in the transmission path between the nodes (the RPR span), in the same way as in the first embodiment, it is configured for storing not only, for each RPR span that is composed of the node numbers (such as, for example, S1 to S2), the physical band and the RPR path band, and the empty band in the physical band, but also the SONET/SDH UPSR band and the SONET/SDH one side path band (refer to FIG. 14).

Also, the communication band calculator 13a shown in FIG. 5, after calculating the communication band (the RPR path band) for each RPR path, based on the VLAN information, calculates the empty band in the physical band of the transmission path. Specifically, it calculates the empty band in the physical band of the transmission path by taking, for each transmission path between the neighboring nodes (that is, between the nodes that are contiguously connected without sandwiching another node, that is, the RPR span), the difference between the physical band of the transmission path, retrieved from the RPR span band management DB 12c, and the RPR path band.

For example, in the case in which, based on information on the physical band retrieved from the RPR span band management DB, and information on the RPR path band, the physical band of the neighboring node pair, which is composed of the node S1 and the node S2 is 2.5 (Gbps), and the RPR path band of the neighboring node pair is 500 (Mbps), the empty band in the physical band of the transmission path is 2.0 (Gbps).

In the same way, the communication band calculator 13a shown in FIG. 5, after the bands of the SONET/SDH UPSR (the SONET path) and the SONET/SDH one side path (the SONET backup system release path) are set by means of the communication band setting unit 13b shown in FIG. 5, calculates and stores the final empty band (refer to FIG. 14).

For example, in the case in which, based on information on the physical band retrieved from the RPR span band management DB and the SONET/SDH UPSR band, as well as on information on the SONET/SDH one side path band, the empty band of the neighboring node pair that is composed of the node S1 and the node S2 is 2.0 (Gbps), and the bands of the SONET/SDH UPSR and the SONET/SDH one side path are 600 (Mbps) each, the final empty band is 800 (Mbps).

Also, the communication band setting unit 13b shown in FIG. 5 sets the bands of the SONET/SDH UPSR (the SONET path) and the SONET/SDH one side path (the SONET backup system release path) for the empty band of the transmission path calculated by means of the communication band calculator 13a, as illustrated in FIG. 11. This is what is meant by effectively using the empty band of the transmission path.

For example, in the case in which the empty band of the neighboring node pair that is composed of the node S1 and the node S2 is 2.0 (Gbps), the bands of the SONET/SDH UPSR and the SONET/SDH one side path are set at 600 (Mbps) each for the empty band of the transmission path, and each setting value is stored in the RPR span band management DB.

Band Management Apparatus Processes (Second Embodiment)

Figure 15:
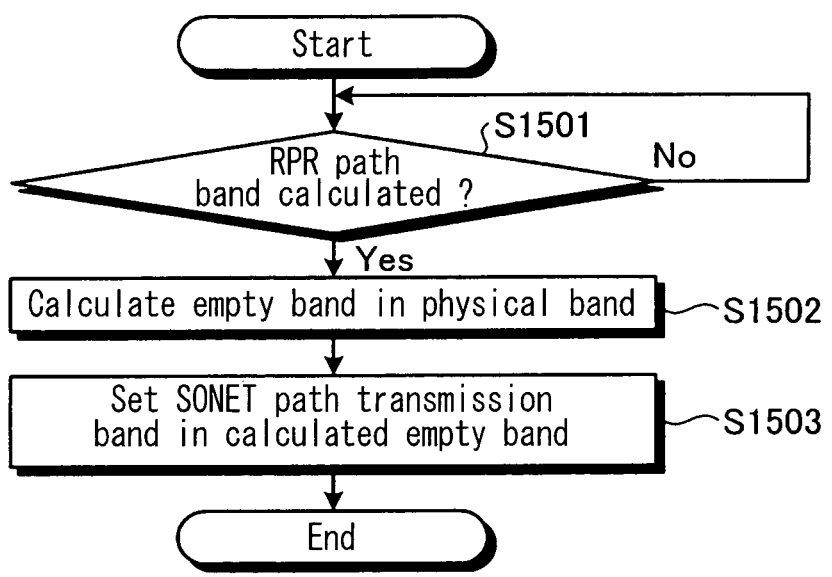
FIG. 15 is a flowchart showing a flow of processes of a band management apparatus according to the second embodiment.

Continuing, a description will be given of the processes by the band management apparatus according to the second embodiment, using FIG. 15. FIG. 15 is a flowchart showing a flow of the processes of the band management apparatus according to the second embodiment.

As shown in the figure, the communication band calculator 13a, after calculating the RPR path band (step S1501, Yes), calculates the empty band in the physical band of the transmission path (step S1502).

Specifically, the communication band calculator 13a calculates the empty band in the physical band of the transmission path by taking, for each transmission path between the neighboring nodes (that is, between the nodes that are contiguously connected without sandwiching another node, that is, the RPR span), the difference between the physical band of the transmission path, retrieved from the RPR span band management DB 12c, and the RPR path band.

For example, in the case in which the physical band of the neighboring node pair that is composed of the node S1 and the node S2, retrieved from the RPR span band management DB, is 2.5 (Gbps), and the RPR path band of the neighboring node pair is 500 (Mbps), the empty band in the physical band of the transmission path is 2.0 (Gbps).

Then, the communication band setting unit 13b sets the bands of the SONET/SDH UPSR (the SONET path) and the SONET/SDH one side path (the SONET backup system release path) for the empty band of the transmission path calculated by means of the communication band calculator 13a, as illustrated in FIG. 11 (step S1503).

For example, in the case in which the empty band of the neighboring node pair that is composed of the node S1 and the node S2 is 2.0 (Gbps), as well as the bands of the SONET/SDH UPSR and the SONET/SDH one side path being set at 600 (Mbps) each for the empty band of the transmission path, and each setting value being stored in the RPR span band management DB, the final empty band is calculated and stored. In the event that the bands of the SONET/SDH UPSR and the SONET/SDH one side path are set at 600 (Mbps) each, the final empty band is 800 (Mbps).

Advantage of Second Embodiment

As heretofore described, according to the second embodiment, in the case in which the ring network is configured sharing the same physical band between a first transmission path (the SONET/SDH path), set based on a first communication method (the SONET/SDH), and a second transmission path (the RPR path), set between the nodes, based on the second communication method (the RPR), the information on the physical band of the transmission path in the ring network being stored in advance, as well as the empty band in the physical band being calculated, based on the information on the communication band calculated for each transmission path between the neighboring nodes, the communication band of the first transmission path (the SONET path) is set for the calculated empty band. Therefore, by setting the communication band of the SONET/SDH path in the empty band in the physical band of the transmission path, and the like, it is possible to effectively use the empty band.

Third Embodiment

Although, in the heretofore described second embodiment, the description is given of the example of the application of the invention in the case of securing the transmission band of the backup side (the backup side band) as the RPR path band, the invention not being limited to this, it is also possible to apply the invention in the same way in a case of arranging in such a way as not to secure the transmission band of the backup side (the backup side band) as the RPR path band. Therein, in a following third embodiment, after describing an outline and features of the third embodiment, an advantage of the third embodiment will be described.

The outline of the band management apparatus according to the third embodiment, in the same way as that of the second embodiment, is that it manages the communication band of the transmission path between the data relay devices (the nodes) in the ring network. A main feature thereof lies in that, as a result of it being possible to set a more appropriate communication band between the neighboring data relay devices (between the neighboring nodes), it is possible to more effectively utilize the physical band of the transmission path.

To give a specific description of the main feature, although the band management apparatus according to the third embodiment, in the same way as the band management apparatus according to the second embodiment, is equipped in advance with a node information management DB (refer to FIG. 17), a VLAN management DB (refer to FIG. 18), and an RPR span band management DB (refer to FIG. 19), the information set in the node information management DB is different. That is, as the transmission band of the backup side for switching to in the event of a problem occurring in the transmission band of the currently used side is not secured, "No" is stored as the protection (switching) information for each node number, as shown in FIG. 17.

Figure 16:
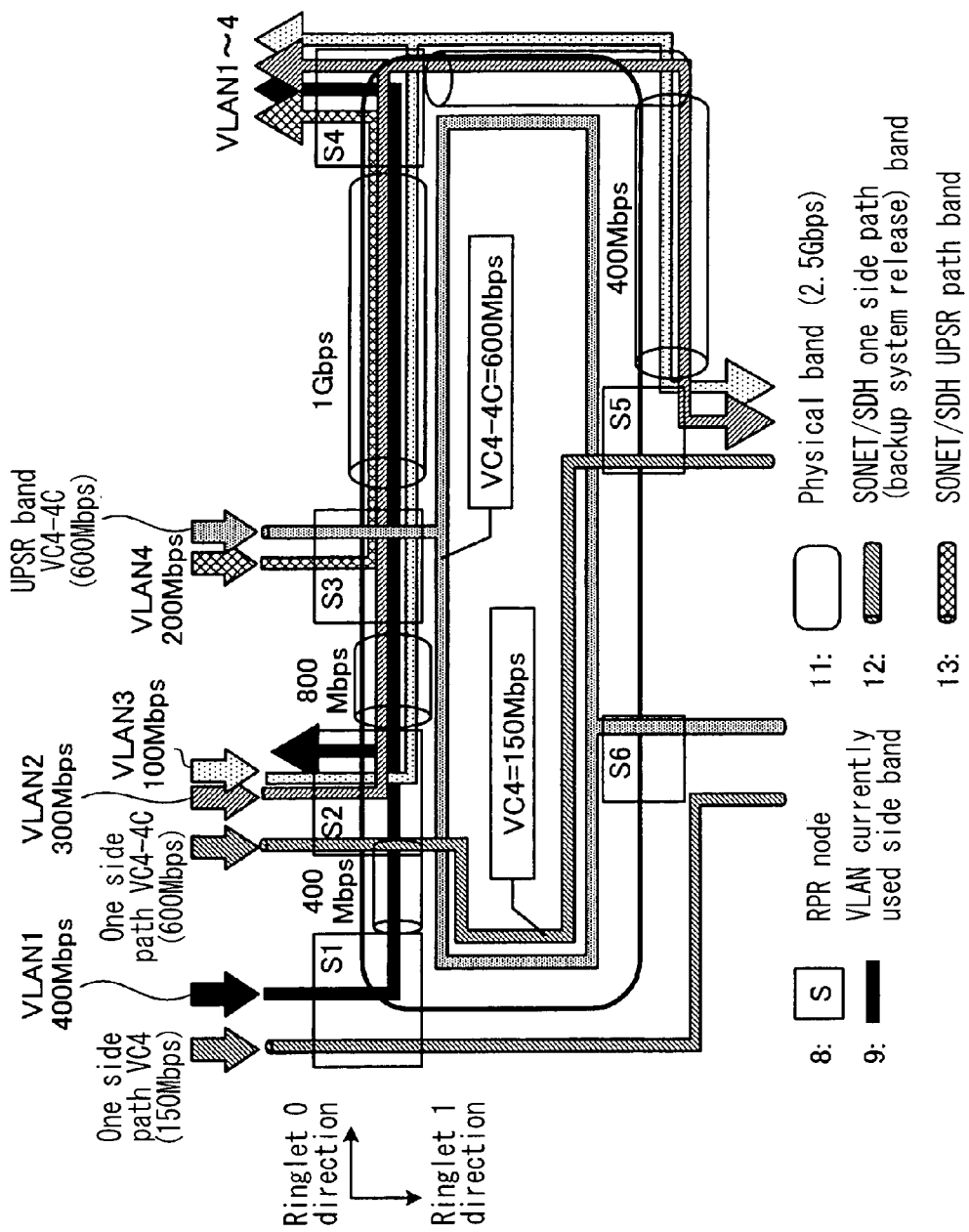
FIG. 16 is a diagram illustrating an outline and features of a third embodiment.

Then, the band management apparatus according to the third embodiment, in the same way as in the heretofore described embodiments, calculates the communication band for each RPR path, based on the VLAN information, as shown in FIG. 16. For example, in the case of the transmission band of the neighboring node pair that is composed of the node S1 and the node S2, retrieved from the VLAN management DB 12b (refer to FIG. 18), as it is determined from protection information that the backup side band is not secured, the RPR path band is calculated as 400 (Mbps) of the currently used side band.

After calculating the communication band for each RPR path, based on the VLAN information, the band management apparatus according to the third embodiment, in the same way as that described in the heretofore described second embodiment, calculates the empty band in the physical band of the transmission path.

For example, in a case in which the physical band of the neighboring node pair that is composed of the node S1 and the node S2, retrieved from the RPR span band management DB, is 2.5 (Gbps), and the RPR path band of the neighboring node pair is 400 (Mbps), the empty band in the physical band of the transmission path is 2.1 (Gbps).

Then, it is also acceptable to arrange in such a way that the band management apparatus according to the third embodiment sets the bands of the SONET/SDH UPSR (the SONET path) and the SONET/SDH one side path (the SONET backup system release path) for the calculated empty band of the transmission path, as illustrated in FIG. 16.

For example, in the case in which the empty band of the neighboring node pair that is composed of the node S1 and the node S2 is 2.1 (Gbps), the bands of the SONET/SDH UPSR and the SONET/SDH one side path are set at 600 (Mbps) each for the empty band of the transmission path and, as well as each setting value being stored in the RPR span band management DB, the final empty band is calculated and stored. In the event that the bands of the SONET/SDH UPSR and the SONET/SDH one side path are set at 600 (Mbps) each, the final empty band is 900 (Mbps)

Advantage of Third Embodiment

As heretofore described, according to the third embodiment, taking into consideration the case in which the backup transmission band is not secured for the RPR path, as the RPR path band is calculated for each pair of neighboring nodes, it also being possible to calculate accurately in the case in which the backup communication band is not secured for the transmission path between the neighboring nodes, it is possible to set the more appropriate communication band for each transmission path. Also, as a result of it being possible to set the more appropriate communication band between the neighboring nodes, it is possible to more effectively utilize the physical band of the transmission path.

Fourth Embodiment

Although, so far, the description has been given of the embodiments of the invention, apart from the heretofore described embodiments, the invention can also be implemented in a variety of differing aspects. Therein, hereafter, a description will be given of other embodiments included in the invention.

1. Calculating and Setting Band in Accordance with Update of VLAN Information

Also, in the heretofore described embodiments, in a case in which the VLAN information stored in the VLAN management DB is updated, it is also acceptable to arrange in such a way that, as well as the RPR path band for each transmission path of the neighboring nodes being calculated anew, each newly calculated RPR path band is newly, individually set as the communication band of the transmission path between the neighboring nodes. By such means, for example, in a case in which the setting of the communication band is updated in accordance with an increase or reduction of the communication band of the packet data flowing along the transmission path, each communication band between the neighboring nodes (for example, between the nodes that are contiguously connected without sandwiching another node) is recalculated and, as a result of it being possible to set the communication band for each transmission path, it is possible to effectively utilize the physical band of the transmission path.

2. Configuration of Ring Network

As described in the heretofore described embodiments, the invention is not limited to the case in which it is applied to the independently configured ring network. Therein, hereafter, a description will be given of a case in which the invention is applied to another ring network configuration.

Figure 20:
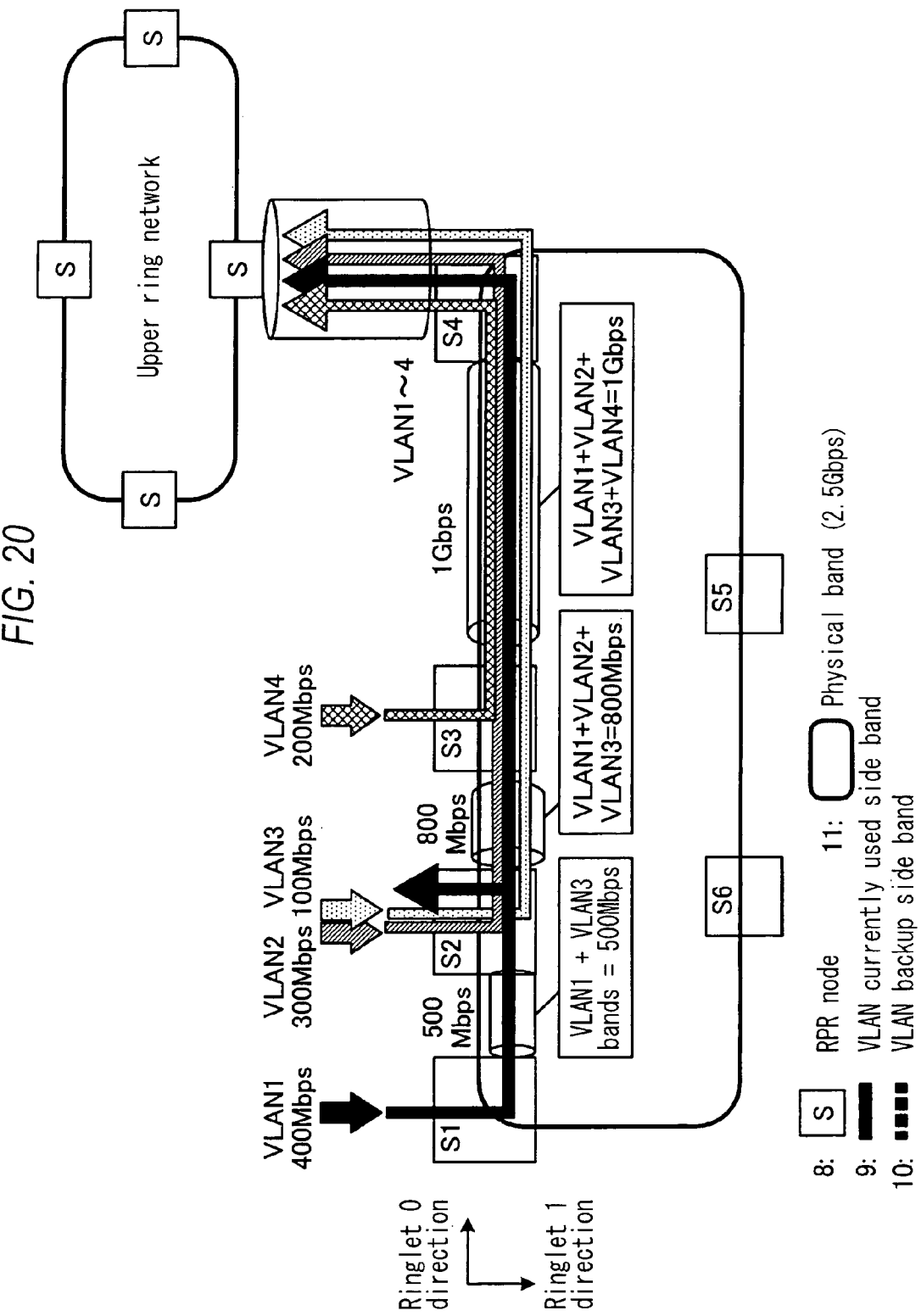
FIG. 20 is a diagram for illustrating an outline and features of a fourth embodiment.

For example, as illustrated in FIG. 20, in a case in which the ring network is connected to an upper ring network with a node as a connection device (a case in which it is a subtending ring configuration), as the band management apparatus according to a fourth embodiment manages the RPR path band set between the nodes, based on the RPR, as well as having the SONET/SDH as the physical layer in the same way as in the heretofore described embodiments, it is equipped in advance with a node information management DB (refer to FIG. 21), a VLAN management DB (refer to FIG. 22), and an RPR span band management DB (refer to FIG. 23). Herein, center node information for identifying a device that connects with the upper ring network being stored in the node information management DB (refer to FIG. 21), in a case in which, for example, a node with an RPR node number "S4" is the connection device, "activated" is recorded in a center node information section corresponding to the RPR node number "S4".

Then, in the same way as in the heretofore described embodiments, the band management apparatus according to the fourth embodiment, on receiving the VLAN setting information from the manager, calculates the communication band for each pair of neighboring nodes (the RPR span), based on the VLAN information, as illustrated in FIG. 20. Also, after calculating the RPR path band for each transmission path between the neighboring nodes, the band management apparatus, as well as individually setting each calculated RPR path band as the RPR path band of the transmission path of the neighboring nodes, stores each calculated RPR path band in the RPR span band management DB, and manages it (refer to FIG. 23).

Also, even in a case in which the packet data reception RPR node is disposed before the center node, the band management apparatus, based on the center node information stored in the node information management DB, controls in such a way that the packet data transmitted between the nodes are not received before the center node.

In this way, in the case in which the ring network is connected to the upper ring network via the node, center node information, for identifying the node that functions as the device that connects with the upper ring network, being stored, as the data communication in the communication band of the transmission path between the neighboring nodes is controlled based on the stored center node information, in the case of adopting the subtending ring configuration in which the ring network is connected to the upper ring network via the center node, it is possible, based on the center node information, to easily control the packet data communication in the communication band set in the transmission path between the neighboring data relay devices, such as controlling in such a way that the packet data are not received before the center node, without changing the transmission and reception nodes of the packet data set for each VLAN.

Figure 24:
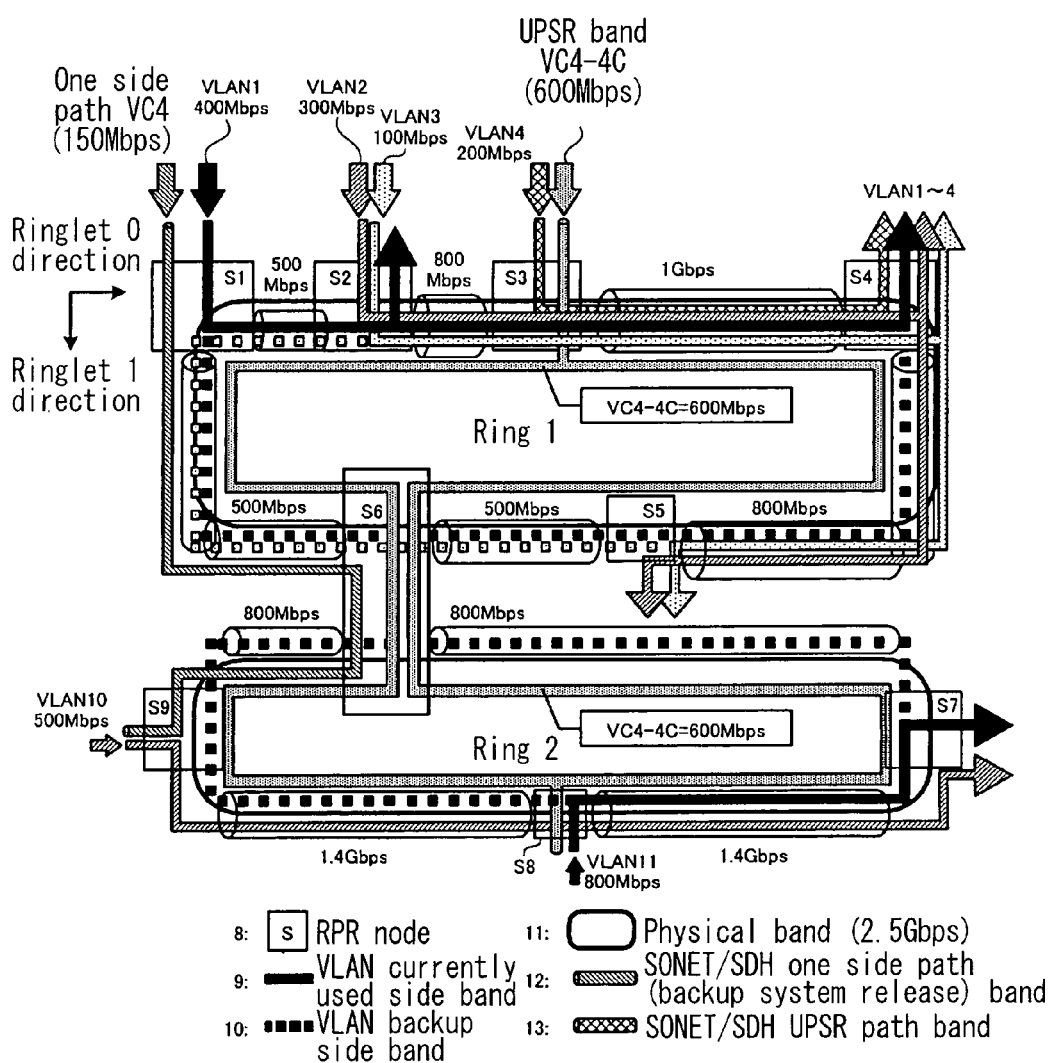
FIG. 24 is a diagram for illustrating the outline and features of the fourth embodiment.

Also, as illustrated in FIG. 24, in a case in which a ring network 1 is connected to another ring network 2 via a node (a case in which it is a multi-ring configuration), as the band management apparatus according to the fourth embodiment manages the RPR path band set between the nodes, based on the RPR, as well as having the SONET/SDH as the physical layer in the same way as in the heretofore described embodiments, it is equipped in advance, for each ring, with a node information management DB (refer to FIGS. 25 and 26), a VLAN management DB (refer to FIGS. 27 and 28), and an RPR span band management DB (refer to FIGS. 29 and 30). Herein, multi-ring connection information for identifying the node that connects the ring networks to each other being stored in the node information management DB (refer to FIGS. 25 and 26), in a case in which, for example, a node with an RPR node number "S6" is the node that connects the ring networks to each other, "activated" is recorded in a multi-ring connection information section corresponding to the RPR node number "S6".

Then, in the same way as in the heretofore described embodiments, the band management apparatus according to the fourth embodiment, on receiving the VLAN setting information from the manager or the like, calculates the RPR path band for each pair of neighboring nodes (the RPR span), based on the VLAN information, as illustrated in FIG. 24. Also, after calculating the RPR path band for each transmission path between the neighboring nodes, the band management apparatus individually sets each calculated RPR path band as the RPR path band of the transmission path of the neighboring nodes, stores each calculated RPR path band in the RPR span band management DB, and manages it (refer to FIGS. 29 and 30).

Also, the band management apparatus according to the fourth embodiment, after calculating the RPR path band for each transmission path between the neighboring nodes, calculates the empty band in the physical band of the transmission path. Then, the band management apparatus, as well as setting the bands of the SONET/SDH UPSR (the SONET path) and the SONET/SDH one side path (the SONET backup system release path) for the calculated empty band of the transmission path, calculates and stores the final empty band (refer to FIGS. 29 and 30).

Unlike FIG. 24, in the case in which the RPR path of the VLAN is set straddling an area between the ring networks, the band management apparatus, based on the multi-ring information stored in the node information management DB (refer to FIGS. 25 and 26) and on the communication band information stored in the VLAN management DB (refer to FIGS. 27 and 28), calculates each RPR path band, between the neighboring nodes, straddling the area between the ring networks and, in the same way as heretofore described, calculates the empty band in the physical band, and sets the bands of the SONET path etc. for the calculated empty band.

In this way, in the case in which the ring network is connected to the other ring network via the node, as well as storing the communication band information (the VLAN information) set for the transmission path for each VLAN set straddling the area between the ring networks, the band management apparatus stores the information (the multi-ring connection information) for identifying the node that connects the ring networks to each other and, based on the stored VLAN information and multi-ring connection information, calculates each communication band between the neighboring nodes for the transmission path straddling the area between the ring networks by connecting the ring networks with the node. Therefore, even in the case in which the ring networks adopt the multi-ring configuration, it being possible to accurately calculate the communication band for the transmission path between the neighboring nodes, it is possible to set an optimum communication band for each transmission path. Also, as a result of it being possible to set the optimum communication band between the neighboring nodes, it is possible to effectively utilize the physical band of the transmission path.

3. Apparatus Configuration Etc.

Also, each component of the band management apparatus 10 shown in FIG. 5 being functionally conceptual, it is not essential that it is physically configured as shown in the figure. That is, dispersed and integrated specific aspects of the band management apparatus 10 not being limited to those shown in the figure, it is possible to configure a whole or one part thereof by dispersing and integrating functionally or physically in optional units, such as, for example, by integrating the communication band calculator 13a and the communication band setting unit 13b, in accordance with various kinds of load and condition of use. Furthermore, with regard to each process function carried out in the band management apparatus 10 (a communication band calculation process function and a communication band setting process function, refer to, for example, FIGS. 9 and 15), a whole or one optional part thereof can be realized by a CPU and a program analysis executed by the CPU, or realized as hardware in accordance with a wired logic.

4. Band Setting Program

Figure 31:
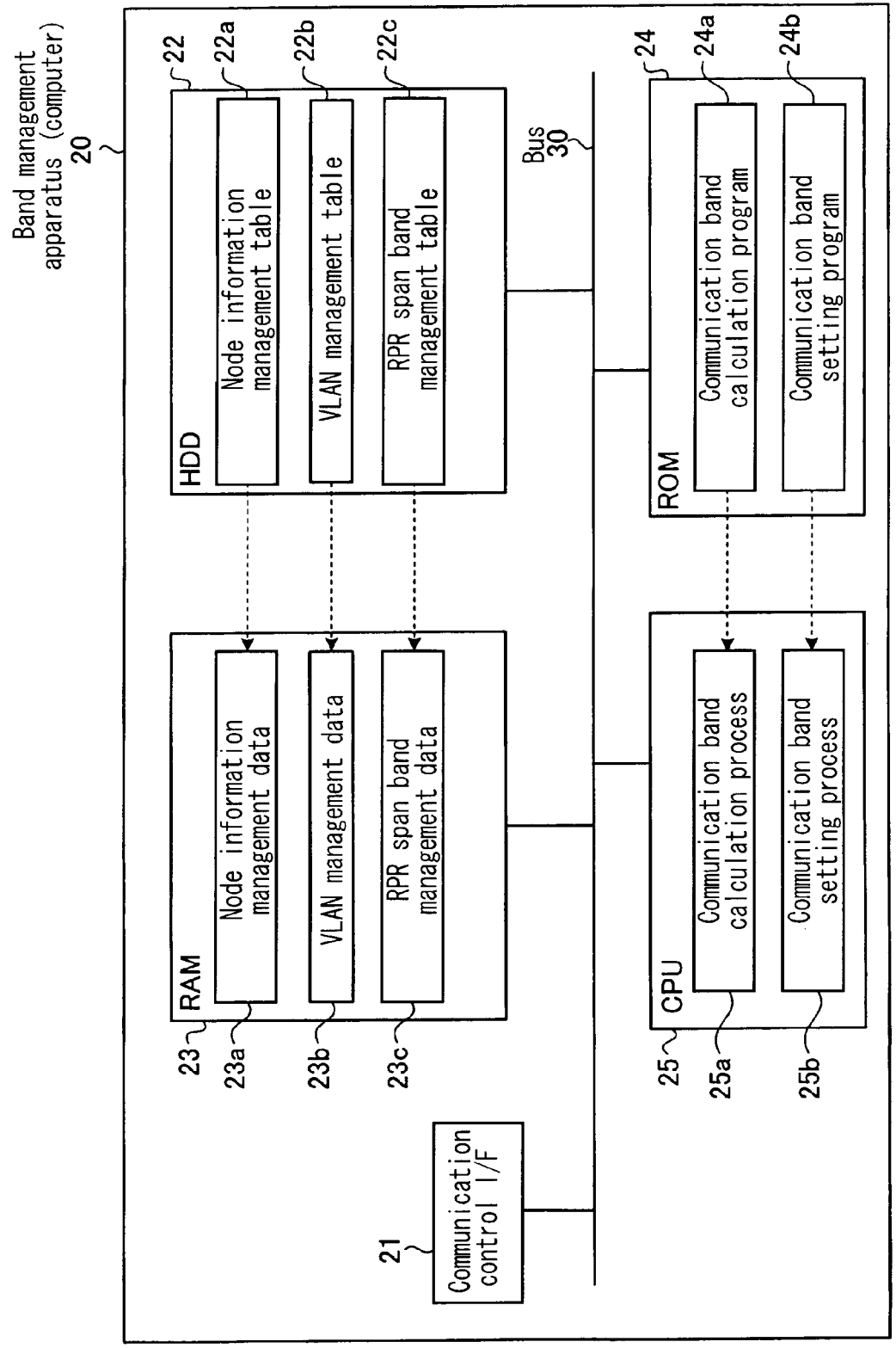
FIG. 31 is a diagram showing a computer that executes a band setting program.

Incidentally, each kind of process (for example, refer to FIG. 9) relating to the band management apparatus 10 described in the heretofore described embodiments can be realized by executing a program prepared in advance on a computer system, such as a personal computer or a work station. Therein, hereafter, a description will be given, using FIG. 31, of one example of a computer that executes a band setting program that has functions identical to those of the band management apparatus 10 described in the heretofore described embodiments. FIG. 31 is a diagram showing the computer that executes the band setting program.

Firstly, as shown in FIG. 31, a computer 20, as the band management apparatus, is configured of a communication control I/F 21, an HDD 22, an RAM 23, an ROM 24, and a CPU 25, connected by a bus 30. The communication control I/F 21 corresponds to the communication control I/F 11 of the band management apparatus 10 shown in FIG. 5.

Then, a band setting program that performs the functions identical to those of the band management apparatus 10 shown in the heretofore described embodiments, that is, as shown in FIG. 31, a communication band calculation program 24a and a communication band setting program 24b, are stored in advance in the ROM 24. With regard to the programs 24a and 24b, it is also acceptable to integrate or disperse as appropriate, in the same way as with the components of the band management apparatus 10 shown in FIG. 5. It is also acceptable that the ROM 24 is a non-volatile RAM.

Then, by the CPU 25 retrieving the programs 24a and 24b from the ROM 24 and executing them, the programs 24a and 24b function as a communication band calculation process 25a and a communication band setting process 25b, as shown in FIG. 31. The processes 25a and 25b correspond respectively to the communication band calculator 13a and the communication band setting unit 13b of the band management apparatus 10 shown in FIG. 5.

Also, as shown in FIG. 31, anode information management table 22a, a VLAN management table 22b, and an RPR span band management table 22c are each provided in the HDD 22. The node information management table 22a, the VLAN management table 22b, and the RPR span band management table 22c correspond respectively to the node information management DB 12a, the VLAN management DB 12b, and the RPR span band management DB 12c shown in FIG. 5. Then, the CPU 25 retrieves node information management data 23a, VLAN management data 23b, and RPR span band management data 23c from, respectively, the node information management table 22a, the VLAN management table 22b, and the RPR span band management table 22c, stores them in the RAM 23, and executes the processes based on the node information management data 23a, the VLAN management data 23b, and the RPR span band management data 23c stored in the RAM 23.

With regard to the heretofore described programs 24a and 24b, it not being essential that they are stored from the outset in the ROM 24, it is also acceptable that the programs are stored in, for example, a "portable physical medium" inserted in the computer 20, such as a flexible disc (an FD), a CD-ROM, a DVD disc, a magnetooptical disc or an IC card, or in a "fixed physical medium", such as an HDD, installed in an interior or on an exterior of the computer 20, or furthermore, in "another computer (or server)" connected to the computer 20 via a public line, an internet, a LAN, a WAN or the like, and that the computer 20 retrieves the programs therefrom, and executes them.

What is claimed is:

1. A band management apparatus for a ring network including a plurality of nodes, comprising:
   a storage to store first information including, for each VLAN ID (Virtual LAN IDentifier), a first node ID, which indicates a first node that transmits a packet with a VLAN ID from outside of the ring network to a receiving side node, a second node ID, which indicates a receiving side node that transmits the packet from the first node to outside of the ring network, a transmission band amount for the VLAN ID and a category of the band, and second information including a band amount for each of all spans between neighboring nodes of the ring network stored by a communication band calculator; and
   a communication band calculator that calculates the band amount for each of all spans between neighboring nodes of the ring network, based on the first information and stores the result to the storage as the second information,
   wherein, the category includes a guaranteed band and a best effort band.

2. The band management apparatus according to claim 1, wherein
   the ring network is configured to share a same physical band between neighboring nodes with a first communication method and a second communication method,
   the communication band calculator calculates an empty band in the physical band, based on the second information of the first communication method, and
   the band management apparatus further comprising a communication band setting unit to set a communication band of the second communication method for the empty band calculated by the communication band calculator.

3. The band management apparatus according to claim 2 in which, as well as a currently used system communication band being set, a backup system communication band is set in the second transmission path, further comprising:
   a backup band setting information storage unit that stores backup band setting information relating to whether or not to set the backup system communication band, wherein
   the communication band calculator, based on the backup band setting information stored by the backup band setting information storage unit, and on the communication band information stored by the storage, calculates the communication band of the transmission path, for each transmission path between the neighboring data relay devices, by adding the currently used system communication band and the backup system communication band.

4. The band management apparatus according to claim 1, wherein the ring network is connected to an upper ring network with the data relay devices as connection devices, further comprising:
   a connection device information storage unit that stores connection device information for identifying data relay devices that function as the connection devices, and
   a data communication controller that controls a data communication in the communication band of the transmission path between the neighboring data relay devices set by the communication band setting unit, based on the connection device information stored by the connection device information storage unit.

5. The band management apparatus according to claim 1, wherein the ring network is connected to another ring network via the data relay devices, further comprising:
   a memory unit that stores information for identifying data relay devices that connect the ring networks to each other, wherein
   the storage stores the information on the communication band set for the transmission path for each network set straddling an area between the ring networks,
   the communication band setting unit, based on the information stored by the storage, and on the information stored by the memory unit, individually calculates, for a transmission path straddling the area between the ring networks by connecting the ring networks with the data relay devices, the communication bands of the neighboring data relay devices.

6. The band management apparatus according to claim 1, wherein
   the communication band calculator, in the event that the information stored by the storage is updated, calculates anew the communication band for each transmission path between the neighboring data relay devices, and
   the communication band setting unit individually sets anew each communication band, newly calculated by the communication band calculator, as the communication band of the transmission path between the neighboring data relay devices.

7. The band management apparatus according to claim 1, wherein:
   when the category indicates a guaranteed band, the communication band calculator calculates the band amount based on the transmission band amount stored as the first information in the storage as a currently used system communication band and as a backup system communication band.

8. A band management method for a ring network including a plurality of nodes, comprising:
   storing, in a memory, first information that indicates, for each VLAN ID (Virtual LAN IDentifier), a first node ID, which indicates a first node that transmits a packet with a VLAN ID from outside of the ring network to a receiving side node, a second node ID, which indicates a receiving side node that transmits the packet from the first node to outside of the ring network, a transmission band amount for the VLAN ID and a category of the band, and second information including a band amount for each of all spans between neighboring nodes of the ring network, stored by a communication band calculator; and
   calculating at the communication band calculator the band amount for each of all spans between neighboring nodes of the ring network, based on the first information and storing the result to the memory as the second information, wherein, the category includes a guaranteed band and a best effort band.

9. The band management method according to claim 8, wherein
   the ring network is configured to share a same physical band between neighboring nodes with a first communication method and a second communication method, the band management method further comprises:
   calculating an empty band in the physical band, based on the second information of the first communication method, and the band management method further comprises a communication band setting step to set a communication band of the second communication method for the empty band calculated.

10. The band management method according to claim 9 in which, as well as a currently used system communication band being set, a backup system communication band is set in the second transmission path, further comprising:

storing, in a memory, backup band setting information relating to whether or not to set the backup system communication band, wherein in the event that it is determined, based on the backup band setting information stored in the memory, that the backup system communication band is to be set in the second transmission path, calculating the communication band of the transmission path, based on the communication band information stored in the memory, for each transmission path between the neighboring data relay devices, by adding the currently used system communication band and the backup system communication band.

11. The band management method according to claim 8, wherein the ring network is connected to an upper ring network with the data relay devices as connection devices, further comprising:

storing, in a memory, connection device information for identifying data relay devices that function as the connection devices, and controlling a data communication in the communication band of the transmission path between the neighboring data relay devices, based on the connection device information stored in the memory.

12. The band management method according to claim 8, wherein the ring network is connected to another ring network via the data relay devices, further comprising:

storing, in a memory, information for identifying data relay devices that connect the ring networks to each other, and the information on the communication band set for the transmission path, for each network set straddling an area between the ring networks; and based on the information stored in the memory by the storage step, and on the information stored in the memory by the storage step, individually calculating, for a transmission path straddling an area between the ring networks by connecting the ring networks with the data relay devices, the communication bands of the neighboring data relay devices.

13. The band management method according to claim 8, further comprising in the event that the information stored in the memory is updated, calculating anew the communication band for each transmission path between the neighboring data relay devices, and individually setting anew each communication band newly calculated, as the communication band of the transmission path between the neighboring data relay devices.

14. The band management method according to claim 8, wherein:

when the category indicates a guaranteed band, further calculating the band amount based on the transmission band amount stored as the first information in the memory as a currently used system communication band and as a backup system communication band.

* * * * *